US012191558B2

(12) United States Patent
Jo et al.

(10) Patent No.: US 12,191,558 B2
(45) Date of Patent: Jan. 7, 2025

(54) ELECTRONIC DEVICE INCLUDING ANTENNA

(71) Applicant: SAMSUNG ELECTRONICS CO., LTD., Suwon-si (KR)

(72) Inventors: Jaehoon Jo, Suwon-si (KR); Hosaeng Kim, Suwon-si (KR); Seongjin Park, Suwon-si (KR); Sumin Yun, Suwon-si (KR); Woomin Jang, Suwon-si (KR); Jehun Jong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 17/988,498

(22) Filed: Nov. 16, 2022

(65) Prior Publication Data

US 2023/0170604 A1 Jun. 1, 2023

Related U.S. Application Data

(63) Continuation of application No. PCT/KR2022/017008, filed on Nov. 2, 2022.

(30) Foreign Application Priority Data

Nov. 30, 2021 (KR) ........................ 10-2021-01685380
Dec. 22, 2021 (KR) ........................ 10-2021-0185092

(51) Int. Cl.
*H01Q 1/24* (2006.01)
*H01Q 1/42* (2006.01)
(Continued)

(52) U.S. Cl.
CPC ............... *H01Q 1/243* (2013.01); *H01Q 1/42* (2013.01); *H01Q 9/0407* (2013.01); *H01Q 21/08* (2013.01); *H01Q 1/48* (2013.01)

(58) Field of Classification Search
CPC ........ H01Q 1/243; H01Q 1/42; H01Q 9/0407; H01Q 21/08; H01Q 1/48
See application file for complete search history.

(56) References Cited

U.S. PATENT DOCUMENTS

2005/0168376 A1 8/2005 Coward et al.
2015/0325925 A1 11/2015 Kamgaing et al.
(Continued)

FOREIGN PATENT DOCUMENTS

JP 2005-20077 1/2005
JP 4224452 2/2009
(Continued)

OTHER PUBLICATIONS

Search Report and Written Opinion dated Feb. 13, 2023 issued in International Patent Application No. PCT/KR2022/017008.

*Primary Examiner* — Dieu Hien T Duong
(74) *Attorney, Agent, or Firm* — Nixon & Vanderhye P.C.

(57) ABSTRACT

According to various embodiments, an electronic device includes: a housing including a lateral member including a conductive member including an inner surface and an outer surface facing the inner surface, an antenna structure disposed in an inner space of the housing and including a substrate, and a plurality of antenna elements disposed at a first interval at the substrate, a plurality of through-holes penetrating the inner surface to at least a part of the outer surface and corresponding to the plurality of antenna elements, and a wireless communication circuit disposed in the inner space and configured to transmit or receive a radio signal in a specified frequency band through the antenna structure, wherein first opening portions of the plurality of through-holes formed in the inner surface are disposed at the first interval, and second opening portions of the plurality of
(Continued)

through-holes formed in the outer surface are disposed at a second interval greater than the first interval.

18 Claims, 39 Drawing Sheets

(51) Int. Cl.

| | |
|---|---|
| ***H01Q 1/48*** | (2006.01) |
| ***H01Q 9/04*** | (2006.01) |
| ***H01Q 21/08*** | (2006.01) |

(56) References Cited

U.S. PATENT DOCUMENTS

| | | | | |
|---|---|---|---|---|
| 2016/0351996 | A1 | 12/2016 | Pu | |
| 2019/0214708 | A1 | 7/2019 | Ouyang et al. | |
| 2020/0136268 | A1 | 4/2020 | Saeidi et al. | |
| 2020/0163204 | A1* | 5/2020 | Kim | H01Q 1/44 |
| 2020/0203804 | A1 | 6/2020 | Khripkov et al. | |
| 2020/0259243 | A1 | 8/2020 | Jeon et al. | |
| 2020/0259258 | A1* | 8/2020 | Amiri | H01Q 5/378 |
| 2021/0159599 | A1 | 5/2021 | Park et al. | |
| 2021/0234278 | A1* | 7/2021 | Futagami | H01Q 13/08 |
| 2022/0069442 | A1 | 3/2022 | Kim et al. | |
| 2022/0376380 | A1 | 11/2022 | Park et al. | |

FOREIGN PATENT DOCUMENTS

| | | |
|---|---|---|
| JP | 6394277 | 9/2018 |
| JP | 6571486 | 9/2019 |
| KR | 10-2018-0011775 | 2/2018 |
| KR | 10-2020-0004870 | 1/2020 |
| KR | 10-2020-0091622 | 7/2020 |
| KR | 10-2021-0063763 | 6/2021 |
| KR | 10-2021-0101781 | 8/2021 |
| WO | 2021/117924 | 6/2021 |

* cited by examiner

Peak r.Gain 9.8dBi

ELECTRONIC DEVICE INCLUDING ANTENNA

CROSS-REFERENCE TO RELATED APPLICATIONS

This application is a continuation of International Application No. PCT/KR2022/017008 designating the United States, filed on Nov. 2, 2022, in the Korean Intellectual Property Receiving Office and claiming priority to Korean Patent Application No. 10-2021-0168380, filed on Nov. 30, 2021, in the Korean Intellectual Property Office, and to Korean Patent Application No. 10-2021-0185092, filed on Dec. 22, 2021, in the Korean Intellectual Property Office, the disclosures of all of which are incorporated by reference herein in their entireties.

BACKGROUND

Field

The disclosure relates to an electronic device including an antenna.

Description of Related Art

With the development of wireless communication technology, electronic devices (e.g., an electronic device for communication) are widely used in daily life, and thus the use of contents is increasing. Due to the rapid increase in the use of content, the network capacity is gradually reaching the limit. After the commercialization of 4th-generation (4G) communication systems, communication systems (e.g., a 5th-generation (5G) communication system, a pre-5G communication system, or a new radio (NR) communication system), which transmit or receive signals using a high-frequency (e.g., mmWave) band (e.g., 3 GHz to 300 GHz band), is studied to satisfy the increasing demands for radio data traffic.

In the case of wireless communication technology, a new antenna structure (e.g., an antenna module) is being developed, which may transmit or receive radio signals using a mmWave band (e.g., a frequency band in a range of about 3G Hz to 100 GHz), address a high free space loss due to frequency characteristics, and implement and satisfy an efficient mounting structure for increasing an antenna gain. The antenna structure may include an antenna array in which various numbers of antenna elements (e.g., conductive patches and/or conductive patterns) are disposed at predetermined intervals. For example, the antenna elements may be disposed in the electronic device to form a beam pattern in any one direction. For example, the antenna structure may be disposed in an inner space of the electronic device to form a directional beam in a direction toward the outside of the electronic device through a non-conductive structure (e.g., a non-conductive portion on a side surface, a rear surface plate, a portion except for a display on a front surface).

The electronic device may include a lateral member including a conductive member to reinforce rigidity and define an aesthetic external appearance. At least a part of the lateral member may include through-holes (e.g., apertures or openings) formed to be aligned with the antenna elements so that the antenna structure radiates a directional beam through the lateral member. The through-holes may be filled with a non-conductive member (e.g., a polymer member or an injection-molded product). The plurality of antenna elements may be disposed on a substrate so as to have a predetermined interval (e.g., half-wavelength) to implement a gain of the antenna array. The plurality of through-holes may also be disposed at intervals corresponding to the above-mentioned intervals.

However, in case that the interval between the antenna elements decreases to make the electronic device slim and to efficiently dispose the electronic device, the gain of the antenna array may be decreased by the through-holes of the lateral member having the interval that decreases to correspond to the interval between the antenna elements. In addition, because the antenna structure needs to be provided in the inner space of the electronic device and disposed to be perpendicular to the through-hole, a thickness of the electronic device needs to be designed in consideration of a vertical mounting height of the antenna structure, which makes it difficult to implement the slim electronic device.

SUMMARY

Embodiments of the disclosure provide an electronic device including an antenna having an arrangement structure that may assist in improving radiation performance.

Embodiments of the disclosure provide an electronic device including an antenna having an arrangement structure that may assist in making the electronic device slim.

According to various example embodiments, an electronic device includes: a housing including a lateral portion including a conductive member comprising a conductive material and including an inner surface and an outer surface facing the inner surface; an antenna structure including an antenna disposed in an inner space of the housing and including a substrate, and a plurality of antenna elements disposed at a first interval at the substrate; a plurality of through-holes penetrating from the inner surface to at least a part of the outer surface and corresponding the plurality of antenna elements; and a wireless communication circuit disposed in the inner space and configured to transmit and/or receive a radio signal in a specified frequency band through the antenna structure, wherein first opening portions of the plurality of through-holes formed in the inner surface are disposed at the first interval, and second opening portions of the plurality of through-holes formed in the outer surface are disposed at a second interval larger than the first interval.

According to various example embodiments, the direction in which the through-holes disposed to respectively correspond to the plurality of antenna elements may be changed, such that a deterioration in radiation performance of the antenna array may be reduced even though the interval between the antenna elements decreases. It is possible to assist in making the electronic device slim by inducing the free arrangement and design of the antenna structure by variously changing the structures of the through-holes.

In addition, various effects that can be directly or indirectly identified through the present disclosure may be provided.

BRIEF DESCRIPTION OF THE DRAWINGS

In connection with the description of the drawings, the same or similar reference numerals may be used for the same or similar components. Further, the above and other aspects, features and advantages of certain embodiments of the present disclosure will be more apparent from the following detailed description, taken in conjunction with the accompanying drawings, in which.

DETAILED DESCRIPTION

Figure 1:
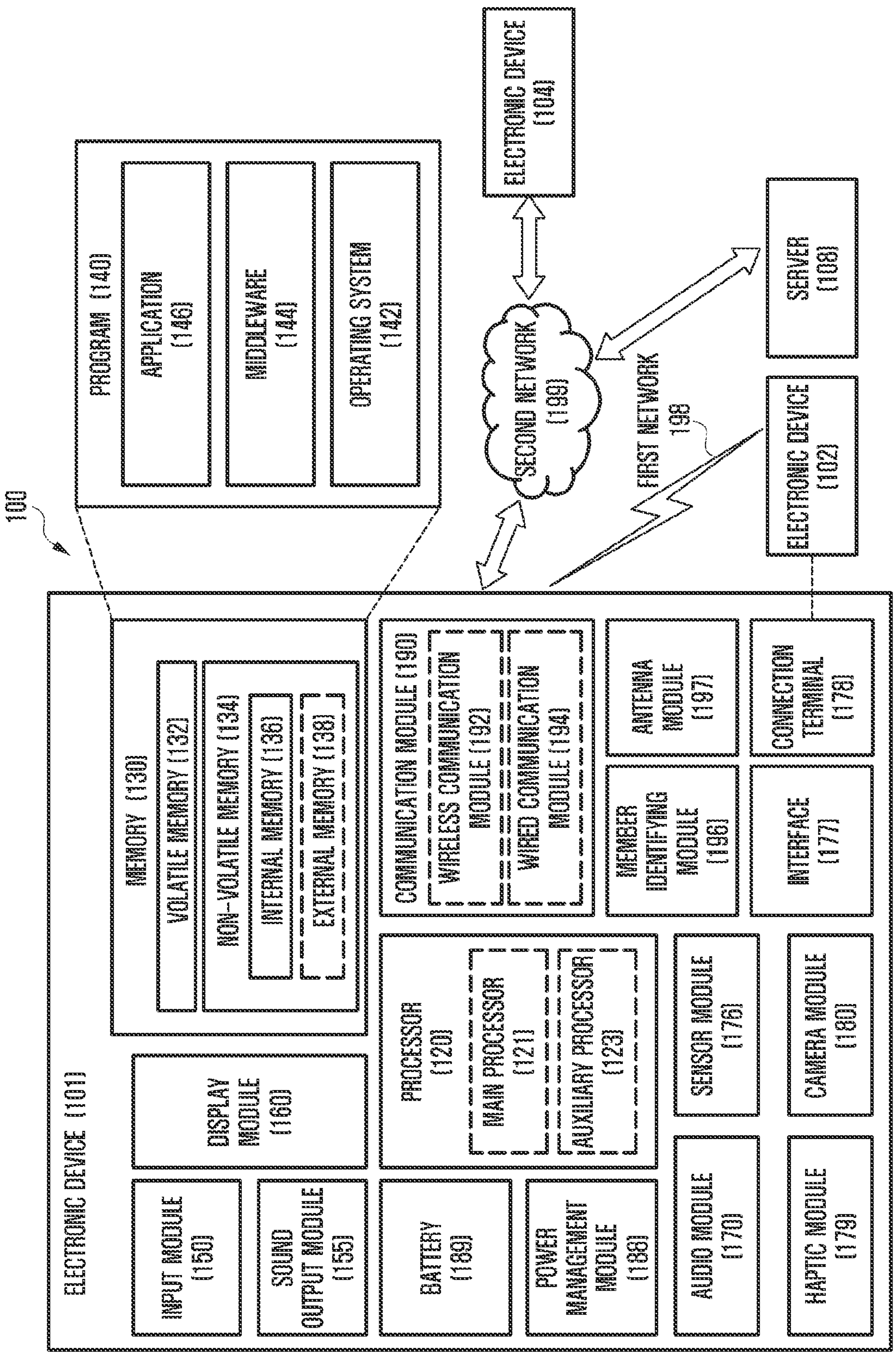
FIG. 1 is a block diagram illustrating an example electronic device in a network environment according to various embodiments.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
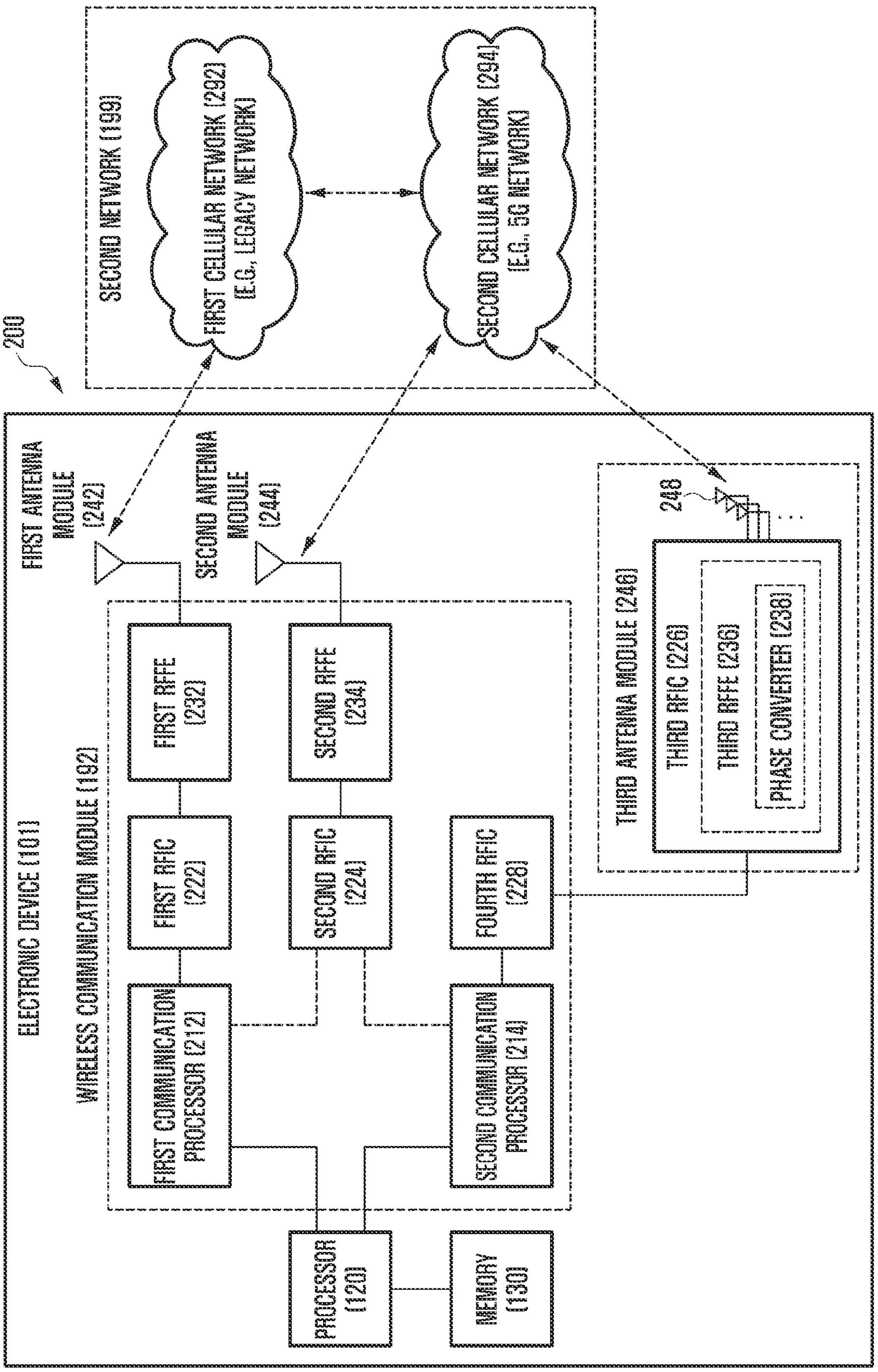
FIG. 2 is a block diagram illustrating an example configuration of the electronic device for supporting legacy network communication and 5G network communication according to various embodiments.

FIG. 2 is a block diagram illustrating an example configuration of an electronic device in a network environment including a plurality of cellular networks according to various embodiments.

Referring to FIG. 2, the electronic device 101 may include a first communication processor (e.g., including processing circuitry) 212, second communication processor (e.g., including processing circuitry) 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may include various processing circuitry and establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RI-PE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
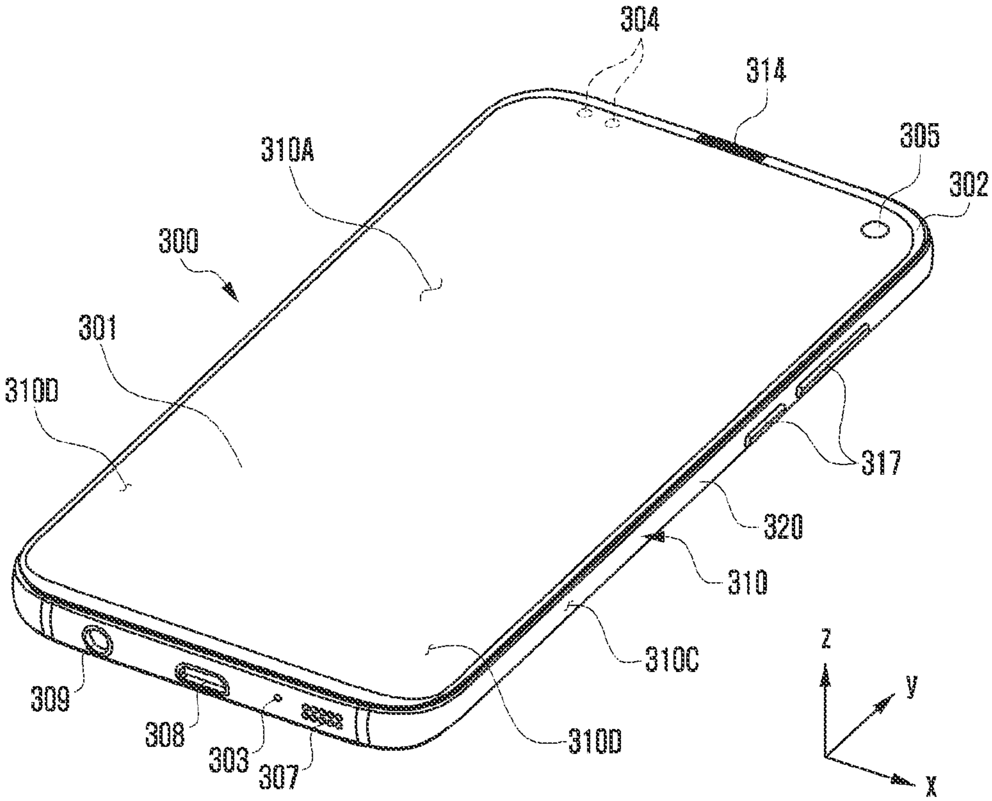
FIG. 3A is a front perspective view of a mobile electronic device according to various embodiments.
Figure 3B:
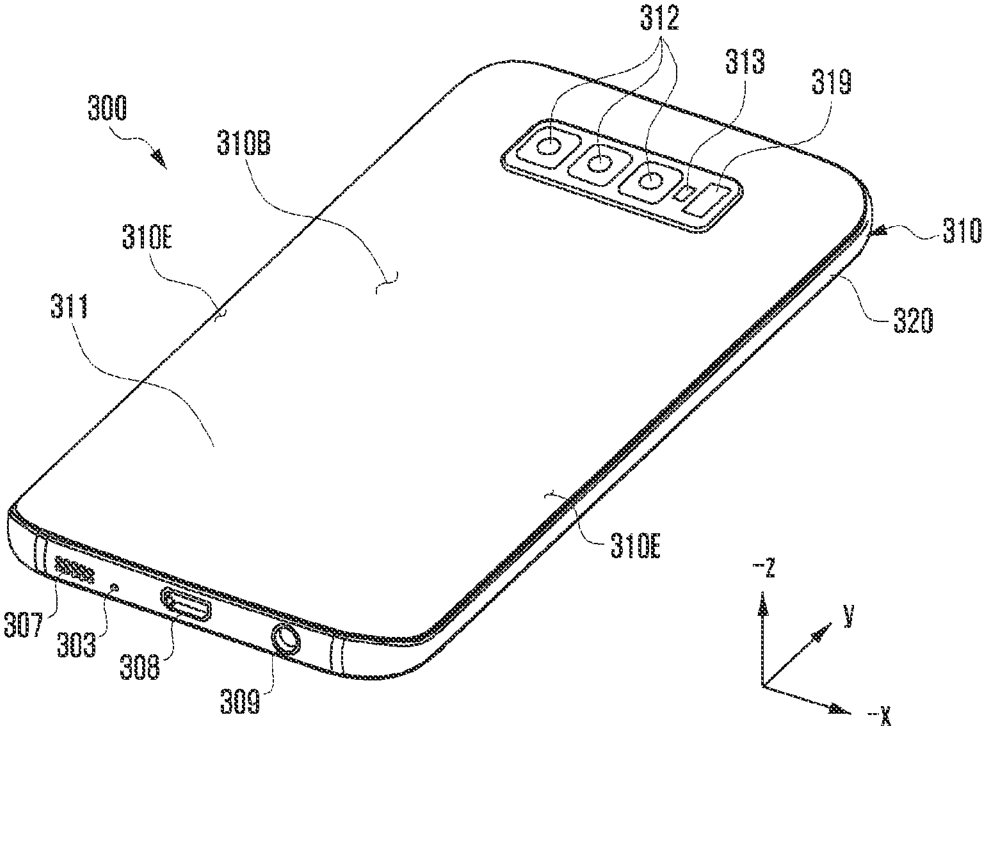
FIG. 3B is a rear perspective view of the mobile electronic device according to various embodiments.

FIG. 3A is a front perspective view of a mobile electronic device according to various embodiments, and FIG. 3B is a rear perspective view of the mobile electronic device shown in FIG. 3A according to various embodiments.

The electronic device 300 in FIGS. 3A and 3B may be at least partially similar to the electronic device 101 in FIG. 1 or may further include various embodiments.

Referring to FIGS. 3A and 3B, a mobile electronic device 300 may include a housing 310 that includes a first surface (or front surface) 310A, a second surface (or rear surface) 310B, and a lateral surface 310C that surrounds a space between the first surface 310A and the second surface 310B. The housing 310 may refer to a structure that forms a part of the first surface 310A, the second surface 310B, and the lateral surface 310C. The first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") 318 which is combined with the front plate 302 and the rear plate 311 and includes a metal and/or polymer. The rear plate 311 and the lateral bezel structure 318 may be integrally formed and may be of the same material (e.g., a metallic material such as aluminum).

The front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. The front plate 302 (or the rear plate 311) may include only one of the first regions 310D (or of the second regions 310E). The first regions 310D or the second regions 310E may be omitted in part. When viewed from a lateral side of the mobile electronic device 300, the lateral bezel structure 318 may have a first thickness (or width) on a lateral side where the first region 310D or the second region 310E is not included, and may have a second thickness, being less than the first thickness, on another lateral side where the first region 310D or the second region 310E is included.

The mobile electronic device 300 may include at least one of a display 301, audio modules 303, 307 and 314, sensor modules 304 and 319, camera modules 305, 312 and 313, a key input device 317, a light emitting device, and connector holes 308 and 309. The mobile electronic device 300 may omit at least one (e.g., the key input device 317 or the light emitting device) of the above components, or may further include other components.

The display 301 may be visible through a substantial portion of the front plate 302, for example. At least a part of the display 301 may be visible through the front plate 302 that forms the first surface 310A and the first region 310D of the lateral surface 310C. Outlines (e.g., edges and corners) of the display 301 may have substantially the same form as those of the front plate 302. The spacing between the outline of the display 301 and the outline of the front plate 302 may be substantially unchanged in order to enlarge the visible area of the display 301.

The audio modules 303, 307 and 314 may correspond to a microphone hole 303 and speaker holes 307 and 314, respectively. The microphone hole 303 may contain a microphone disposed therein for acquiring external sounds and, in a case, contain a plurality of microphones to sense a sound direction. The speaker holes 307 and 314 may be classified into an external speaker hole 307 and a call receiver hole 314. The microphone hole 303 and the speaker holes 307 and 314 may be implemented as a single hole, or a speaker (e.g., a piezo speaker) may be provided without the speaker holes 307 and 314.

The sensor modules 304 and 319 may generate electrical signals or data corresponding to an internal operating state of the mobile electronic device 300 or to an external environmental condition. The sensor modules 304 and 319 may include a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) and/or a fourth sensor module (e.g., a fingerprint sensor) disposed on the second surface 310B of the housing 310. The fingerprint sensor may be disposed on the second surface 310B as well as the first surface 310A (e.g., the display 301) of the housing 310. The electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312 and 313 may include a first camera device 305 disposed on the first surface 310A of the electronic device 300, and a second camera module 312 and/or a flash 313 disposed on the second surface 310B. The camera module 305 or the camera module 312 may include one or more lenses, an image sensor, and/or an image signal processor. The flash 313 may include, for example, a light emitting diode or a xenon lamp. Two or more lenses (infrared cameras, wide angle and telephoto lenses) and image sensors may be disposed on one side of the electronic device 300.

The key input device 317 may be disposed on the lateral surface 310C of the housing 310. The mobile electronic device 300 may not include some or all of the key input device 317 described above, and the key input device 317 which is not included may be implemented in another form such as a soft key on the display 301. The key input device 317 may include the sensor module disposed on the second surface 310B of the housing 310.

The light emitting device may be disposed on the first surface 310A of the housing 310. For example, the light emitting device may provide status information of the electronic device 300 in an optical form. The light emitting device may provide a light source associated with the operation of the camera module 305. The light emitting device may include, for example, a light emitting diode (LED), an IR LED, or a xenon lamp.

The connector holes 308 and 309 may include a first connector hole 308 adapted for a connector (e.g., a universal serial bus (USB) connector) for transmitting and receiving power and/or data to and from an external electronic device, and/or a second connector hole 309 adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. In an embodiment, some sensor modules 304 may be arranged to perform their functions without being visually exposed through the front plate 302 in the internal space of the electronic device. For example, in this case, an area of the display 301 facing the sensor module may not require a perforated opening.

Figure 3C:
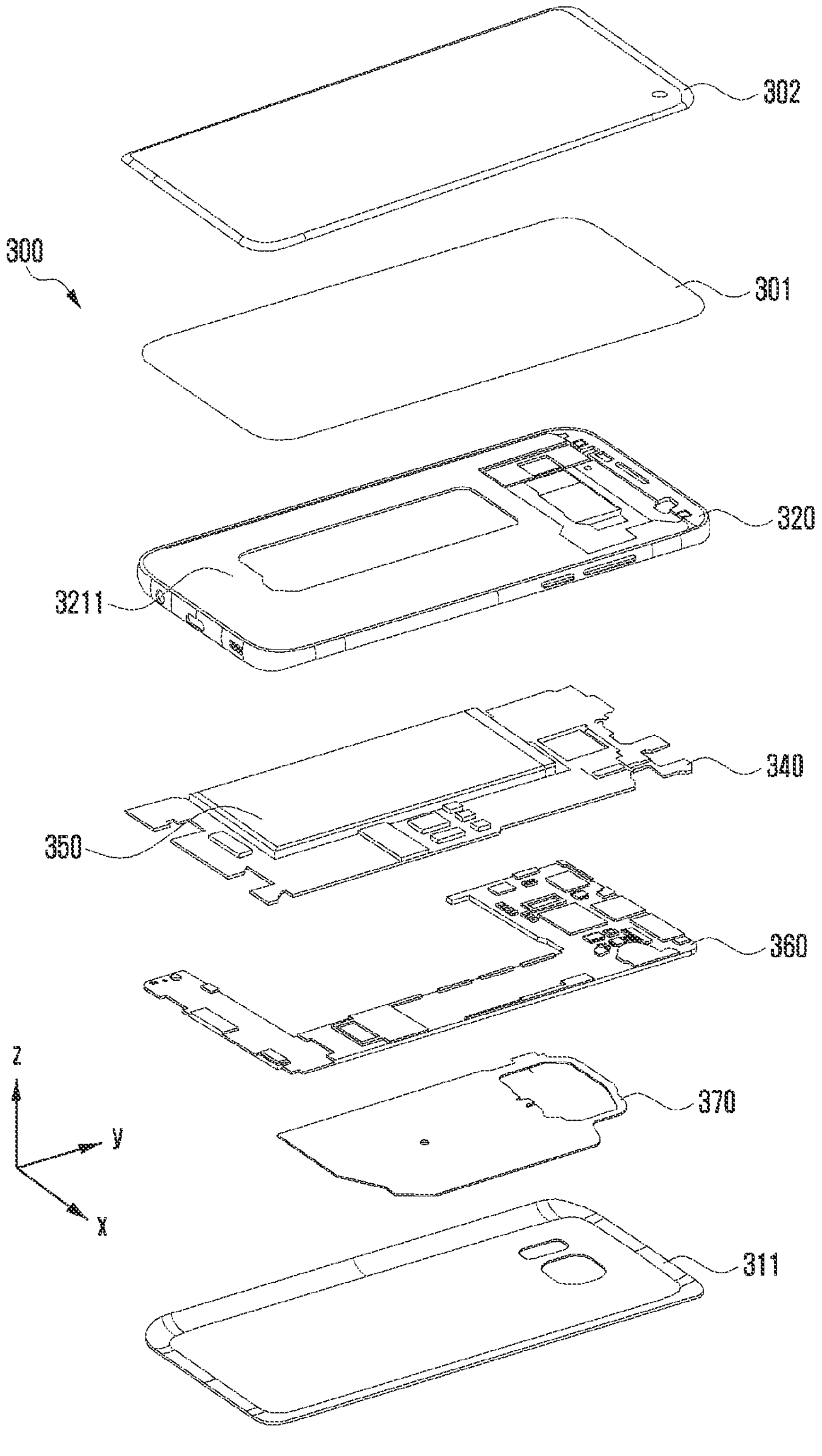
FIG. 3C is an exploded perspective view of the mobile electronic device according to various embodiments.

FIG. 3C is an exploded perspective view illustrating the mobile electronic device shown in FIG. 3A according to various embodiments.

Referring to FIG. 3C a mobile electronic device 300 may include a lateral bezel structure 320, a first support member 3211 (e.g., a bracket), a front plate 302, a display 301, an electromagnetic induction panel (not shown), a printed circuit board (PCB) 340, a battery 350, a second support member 360 (e.g., a rear case), an antenna 370, and a rear plate 311. The mobile electronic device 300 may omit at least one (e.g., the first support member 3211 or the second support member 360) of the above components or may further include another component. Some components of the electronic device 300 may be the same as or similar to those of the mobile electronic device 101 shown in FIG. 3A or FIG. 3B, thus, descriptions thereof may not be repeated below.

The first support member 3211 is disposed inside the mobile electronic device 300 and may be connected to, or integrated with, the lateral bezel structure 320. The first support member 3211 may be formed of, for example, a metallic material and/or a non-metal (e.g., polymer) material. The first support member 3211 may be combined with the display 301 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 311 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 320 and/or the first support member 3211.

Figure 4A:
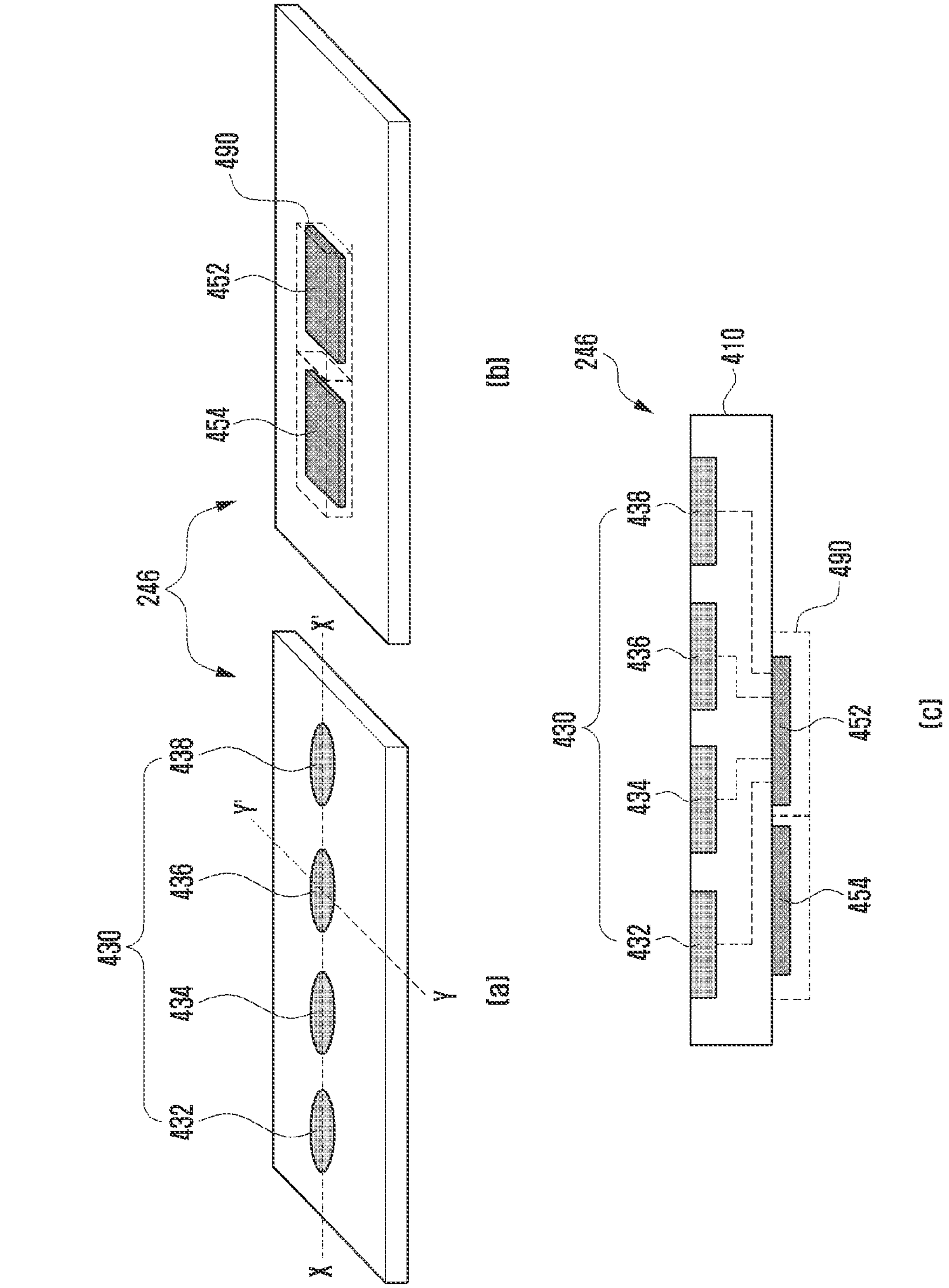
FIG. 4A is a diagram illustrating an example structure of a third antenna module according to various embodiments.

FIG. 4A is a diagram illustrating various views of an example structure of, for example, a third antenna module described with reference to FIG. 2 according to various embodiments. FIG. 4A(a) is a perspective view illustrating the third antenna module 246 viewed from one side, and FIG. 4A(b) is a perspective view illustrating the third antenna module 246 viewed from the other side. FIG. 4A(c) is a cross-sectional view illustrating the third antenna module 246 taken along line X-X' of FIG. 4A.

With reference to FIG. 4A, in an embodiment, the third antenna module 246 may include a printed circuit board 410, an antenna array 430, a RFIC 452, and a PMIC 454. The third antenna module 246 may further include a shield member 490. In various embodiments, at least one of the above-described components may be omitted or at least two of the components may be integrally formed.

The printed circuit board 410 may include a plurality of conductive layers and a plurality of non-conductive layers stacked alternately with the conductive layers. The printed circuit board 410 may provide electrical connections between the printed circuit board 410 and/or various electronic components disposed outside using wirings and conductive vias formed in the conductive layer.

The antenna array 430 (e.g., 248 of FIG. 2) may include a plurality of antenna elements 432, 434, 436, or 438 disposed to form a directional beam. As illustrated, the antenna elements 432, 434, 436, or 438 may be formed at a first surface of the printed circuit board 410. According to an embodiment, the antenna array 430 may be formed inside the printed circuit board 410. According to the embodiment, the antenna array 430 may include the same or a different shape or kind of a plurality of antenna arrays (e.g., dipole antenna array and/or patch antenna array).

The RFIC 452 (e.g., the third RFIC 226 of FIG. 2) may be disposed at another area (e.g., a second surface opposite to the first surface) of the printed circuit board 410 spaced apart from the antenna array. The RFIC 452 is configured to process signals of a selected frequency band transmitted/received through the antenna array 430. According to an embodiment, upon transmission, the RFIC 452 may convert a baseband signal obtained from a communication processor (not shown) to an RF signal of a designated band. Upon reception, the RFIC 452 may convert an RF signal received through the antenna array 430 to a baseband signal and transfer the baseband signal to the communication processor.

According to an embodiment, upon transmission, the RFIC 452 may up-convert an IF signal (e.g., about 9 GHz to about 11 GHz) obtained from an intermediate frequency integrate circuit (IFIC) (e.g., 228 of FIG. 2) to an RF signal of a selected band. Upon reception, the RFIC 452 may down-convert the RF signal obtained through the antenna array 430, convert the RF signal to an IF signal, and transfer the IF signal to the IFIC.

The PMIC 454 may be disposed in another partial area (e.g., the second surface) of the printed circuit board 410 spaced apart from the antenna array 430. The PMIC 454 may receive a voltage from a main PCB (not illustrated) to provide power necessary for various components (e.g., the RFIC 452) on the antenna module.

The shielding member 490 may be disposed at a portion (e.g., the second surface) of the printed circuit board 410 so as to electromagnetically shield at least one of the RFIC 452 or the PMIC 454. According to an embodiment, the shield member 490 may include a shield can.

Although not shown, in various embodiments, the third antenna module 246 may be electrically connected to another printed circuit board (e.g., main circuit board) through a module interface. The module interface may include a connecting member, for example, a coaxial cable connector, board to board connector, interposer, or flexible printed circuit board (FPCB). The RFIC 452 and/or the PMIC 454 of the antenna module may be electrically connected to the printed circuit board through the connection member.

Figure 4B:
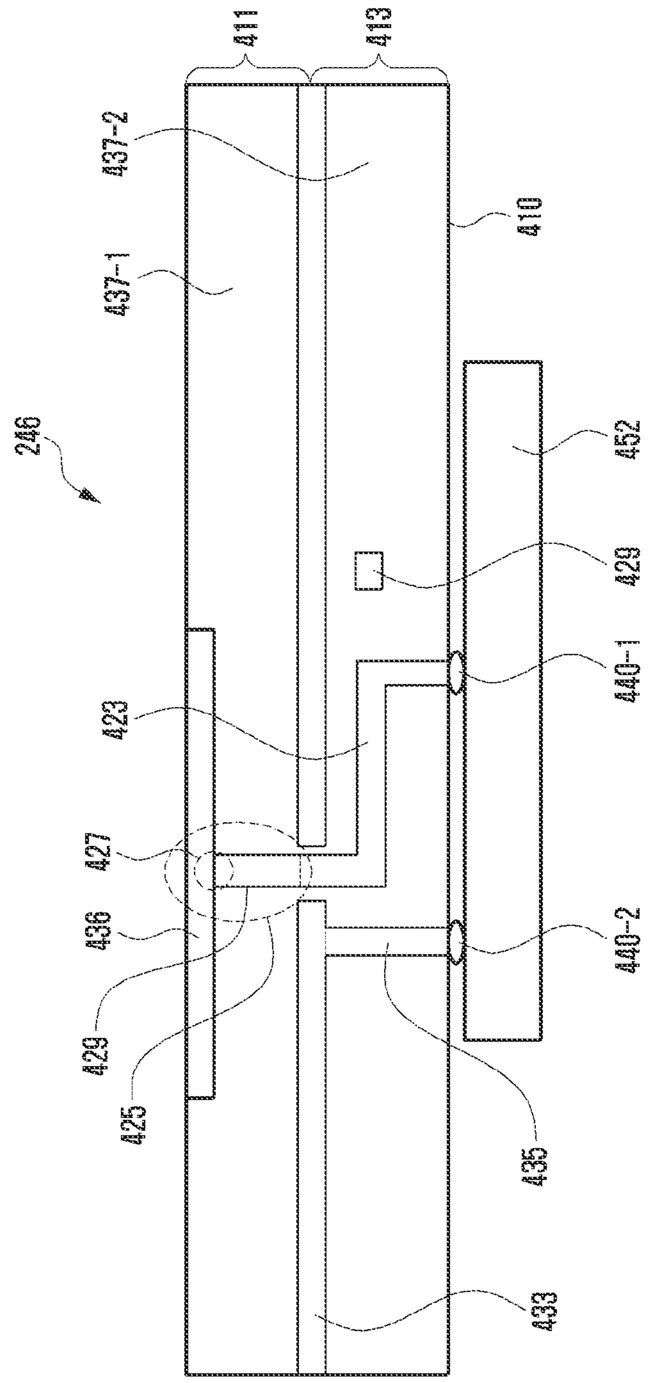
FIG. 4B is a cross-sectional view taken along line Y-Y' of the third antenna module illustrated in FIG. 4A according to various embodiments.

FIG. 4B is a cross-sectional view illustrating the third antenna module 246 taken along line Y-Y' of FIG. 4A(a) according to various embodiments. The printed circuit board 410 of the illustrated embodiment may include an antenna layer 411 and a network layer 413.

Referring to FIG. 4B, the antenna layer 411 may include at least one dielectric layer 437-1, and an antenna element 436 and/or a power feeding portion 425 formed on or inside an outer surface of a dielectric layer. The power feeding portion 425 may include a power feeding point 427 and/or a power feeding line 429.

The network layer 413 may include at least one dielectric layer 437-2, at least one ground layer 433, at least one conductive via 435, a transmission line 423, and/or a power feeding line 429 formed on or inside an outer surface of the dielectric layer.

Further, in the illustrated embodiment, the RFIC 452 (e.g., the third RFIC 226 of FIG. 2) of FIG. 4A(c) may be electrically connected to the network layer 413 through, for example, first and second solder bumps 440-1 and 440-2. In various embodiments, various connection structures (e.g., solder or ball grid array (BGA)) instead of the solder bumps may be used. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. Although not illustrated, the RFIC 452 may also be electrically connected to the above-described module interface through the power feeding line 429.

Figure 5:
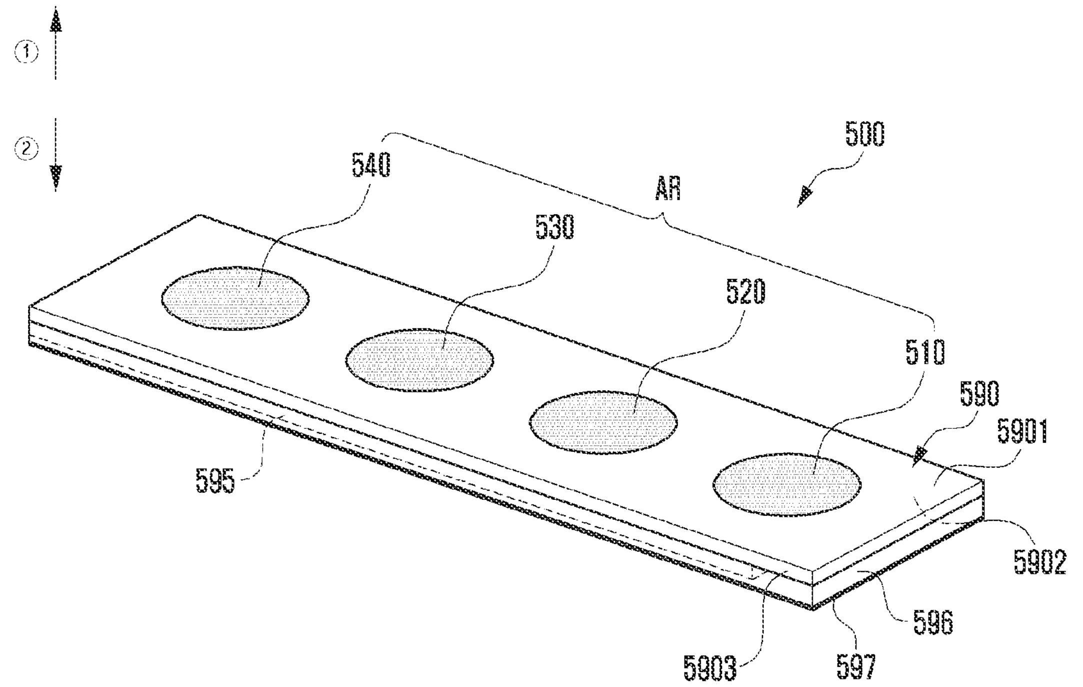
FIG. 5 is a perspective view of an example antenna structure according to various embodiments.

FIG. 5 is a perspective view of an antenna structure according to various embodiments.

With reference to FIG. 5, an antenna structure 500 (e.g., an antenna module) may include a substrate 590 (e.g., a printed circuit board), and an antenna array AR, e.g., a plurality of antenna elements 510, 520, 530, and 540 disposed at the substrate 590. According to an embodiment, the substrate 590 may include: a first surface 5901 directed in a predetermined (e.g., specified) direction (e.g., direction ①); a second surface 5902 directed in a direction (e.g., direction ②) opposite to the first surface 5901; and a side surface 5903 configured to surround a space between the first surface 5901 and the second surface 5902. According to an embodiment, the plurality of antenna elements 510, 520, 530, and 540 may be disposed to be exposed to the first surface 5901 or disposed between the first surface 5901 and the second surface 5902 and provided at positions close to the first surface 5901. The plurality of antenna elements 510, 520, 530, and 540 may form directional beams (e.g., beam patterns) in a direction (e.g., direction ①) in which the first surface 5901 is directed. According to an embodiment, the plurality of antenna elements 510, 520, 530, and 540 may include a plurality of conductive patches and/or a plurality of conductive patterns disposed at the substrate 590.

According to various embodiments, the antenna structure 500 may include a wireless communication circuit 595 disposed on the second surface 5902 of the substrate 590 and electrically connected to the plurality of antenna elements 510, 520, 530, and 540. According to an embodiment, the wireless communication circuit 595 may be set up to transmit or receive wireless frequencies in a range of about 3G Hz to 300 GHz through the antenna array AR. In various embodiments, the wireless communication circuit 595 may be provided in the inner space (e.g., the inner space 6001 in FIG. 6A) of the electronic device (e.g., the electronic device 600 in FIG. 6A), disposed at a position spaced apart from the substrate 590, and electrically connected to the substrate 590 through an electrical connection member (e.g., a flexible RF cable (FRC)).

According to various embodiments, the wireless communication circuit 595 electrically connected to the plurality of antenna elements 510, 520, 530, and 540 may include RFICs (e.g., RFICs 222, 224, 226, and/or 228 in FIG. 2). For example, the plurality of antenna elements 510, 520, 530, and 540 may be disposed on one surface (e.g., the first surface 5901) of the substrate 590 or embedded at the position close to one surface. The RFICs (e.g., the RFICs 222, 224, 226, and/or 228 in FIG. 2) may be disposed on the other surface (e.g., the second surface 5902) of the substrate 590. According to an embodiment, the wireless communication circuit 595 may be configured to form directional beams in a predetermined frequency band (e.g., a frequency band in a range of about 3 GHz to 100 GHz) by means of the plurality of antenna elements 510, 520, 530, and 540.

According to various embodiments, the plurality of antenna elements 510, 520, 530, and 540 may include a first antenna element 510, a second antenna element 520, a third antenna element 530, or a fourth antenna element 540 disposed to be spaced apart from one another at predetermined intervals. According to an embodiment, the plurality of antenna elements 510, 520, 530, and 540 may be disposed in a row. In various embodiments, the plurality of antenna elements 510, 520, 530, and 540 may be disposed in the form of a matrix (e.g., a 2×2 matrix). According to an embodiment, the plurality of antenna elements 510, 520, 530, and 540 may have substantially the same shape. In various embodiments, the antenna structure 500 may include the antenna array AR including the four antenna elements 510, 520, 530, and 540, but the present disclosure is not limited thereto. For example, the antenna structure 500 may include a single antenna element or include two, three, or five or more antenna elements as the antenna array AR. In various embodiments, the antenna structure 500 may further include the plurality of conductive patterns (e.g., a dipole antenna) disposed at the substrate 590. In various embodiments, the plurality of conductive patterns (e.g., the dipole antenna) may be provided at the substrate 590 having a plurality of insulating layers (e.g., dielectric material layers) and disposed on the same insulating layer as the plurality of antenna elements 510, 520, 530, and 540 or disposed on the different insulating layers from the plurality of antenna elements 510, 520, 530, and 540. In various embodiments, the plurality of conductive patterns (e.g., the dipole antenna) may be disposed in an area that does not overlap the plurality of antenna elements 510, 520, 530, and 540 when the first surface 5901 is viewed from above. In this case, no ground layer may be disposed in a corresponding area of the substrate 590 in which the plurality of conductive patterns is disposed. In various embodiments, the plurality of conductive patterns (e.g., the dipole antenna) may be disposed in the substrate 590. The plurality of antenna elements 510, 520, 530, and 540 may be disposed to be exposed to an outer surface (e.g., the first surface 5901) of the substrate 590. In this case, the plurality of conductive patterns may be disposed so that a direction of the beam pattern formed by the conductive patterns is different from (e.g., perpendicular to) a direction of the beam pattern formed by the antenna array AR.

According to various embodiments, the antenna structure 500 may include one or more power supply units respectively disposed on the plurality of antenna elements 510, 520, 530, and 540. According to an embodiment, the antenna array AR may operate as a single polarization antenna or a dual polarization antenna through one or more power supply units.

According to various embodiments, the antenna module 500 may include a protection member 596 disposed on the second surface 5902 of the printed circuit board 590 and disposed to at least partially surround the wireless communication circuit 595. According to an embodiment, the protection member 596 may be a protective layer disposed to surround the wireless communication circuit 595 and include a dielectric material that is cured and/or solidified after being applied. According to an embodiment, the protection member 596 may include epoxy resin. According to an embodiment, the protection member 596 may be disposed on the second surface 5902 of the printed circuit board 590 and surround a part or the entirety of the wireless communication circuit 595. According to an embodiment, the antenna module 500 may include a conductive shield layer 597 stacked on a surface of the protection member 596. According to an embodiment, the conductive shield layer 597 may prevent and/or reduce noise (e.g., DC-DC noise or interference frequency components) generated by the antenna module 500 from being diffused to the periphery. According to an embodiment, the conductive shield layer 597 may include an electrically conductive material applied onto the surface of the protection member 596 by a thin-film deposition method such as sputtering. According to an embodiment, the conductive shield layer 597 may electrically connected to a ground of the printed circuit board 590. As an embodiment, the protection member 596 and/or the conductive shield layer 597 may be replaced with a shield can mounted on the printed circuit board.

Figure 6A:
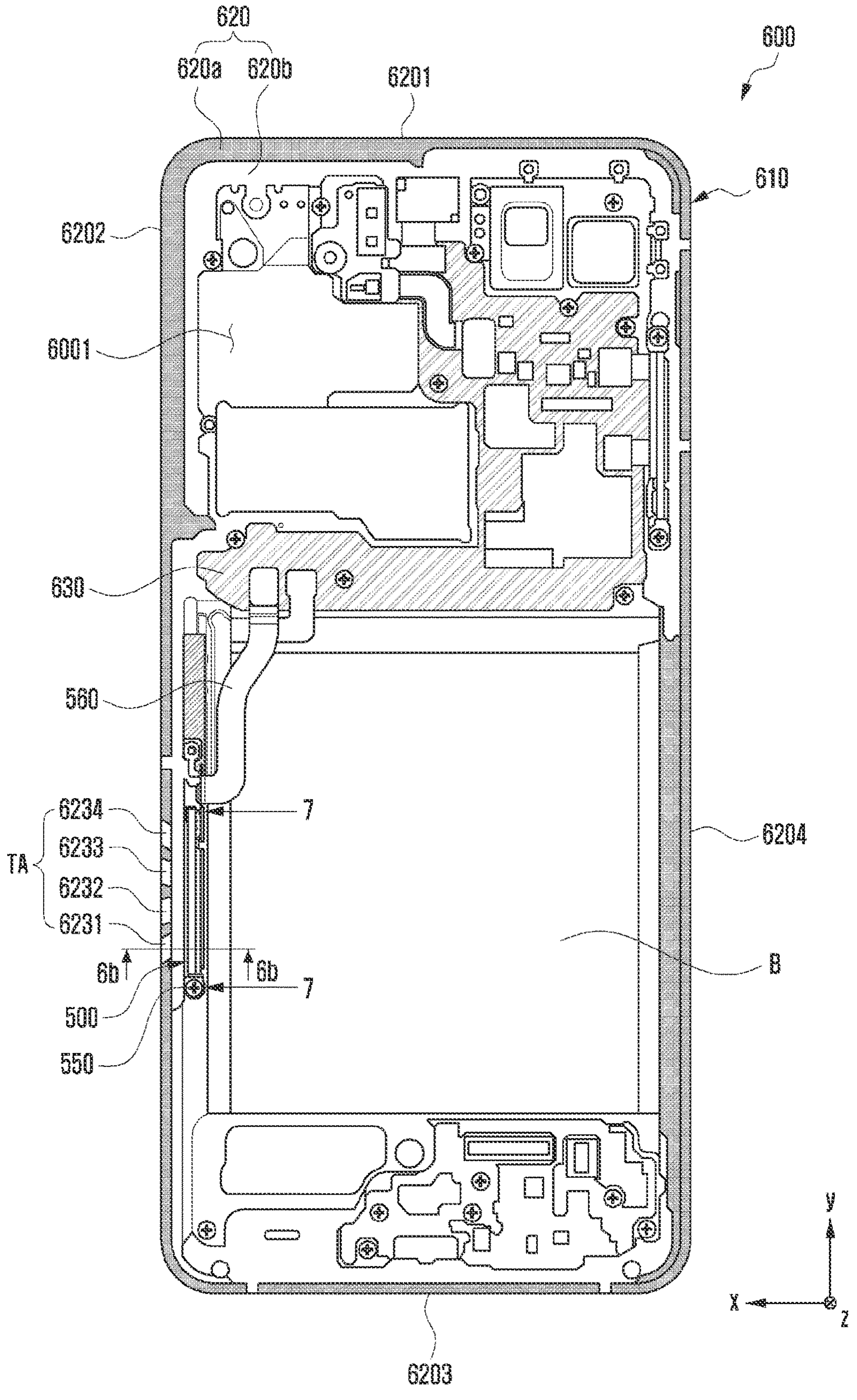
FIG. 6A is a diagram illustrating an example electronic device in which the antenna structure is disposed according to various embodiments.
Figure 6B:
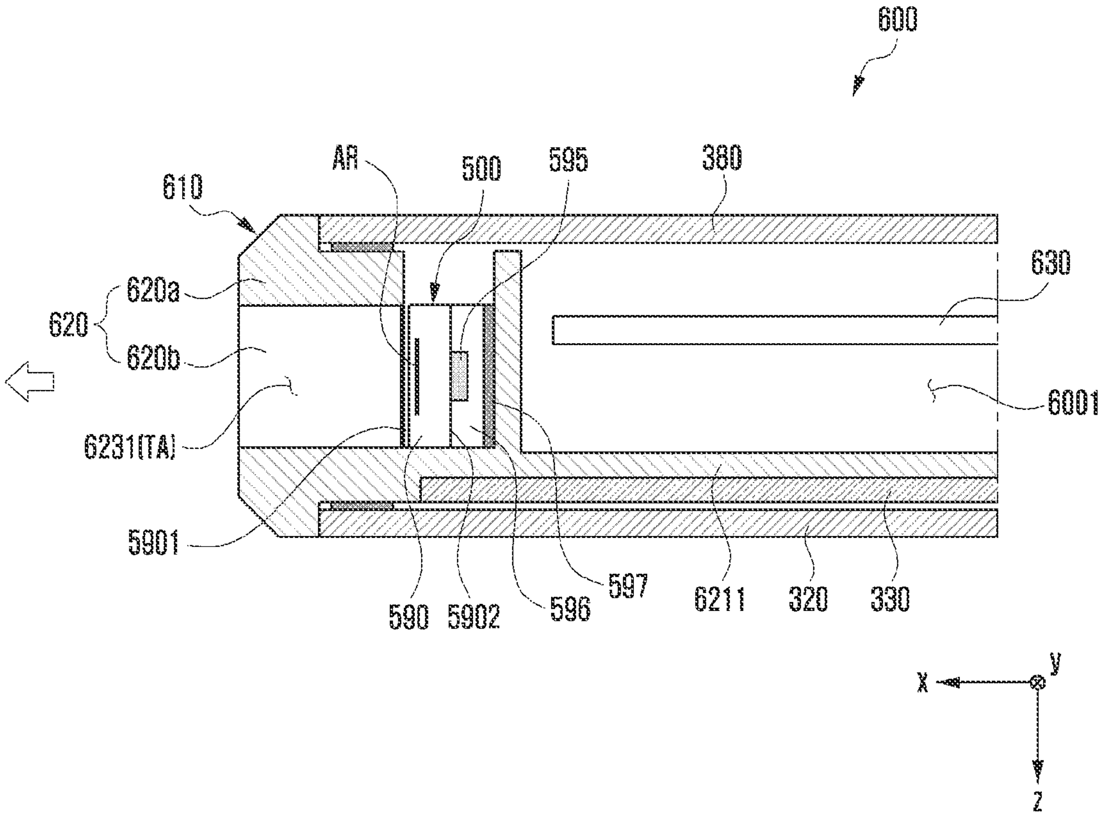
FIG. 6B is a partial cross-sectional view of the electronic device taken along line 6*b*-6*b* in FIG. 6A according to various embodiments.
Figure 6C:
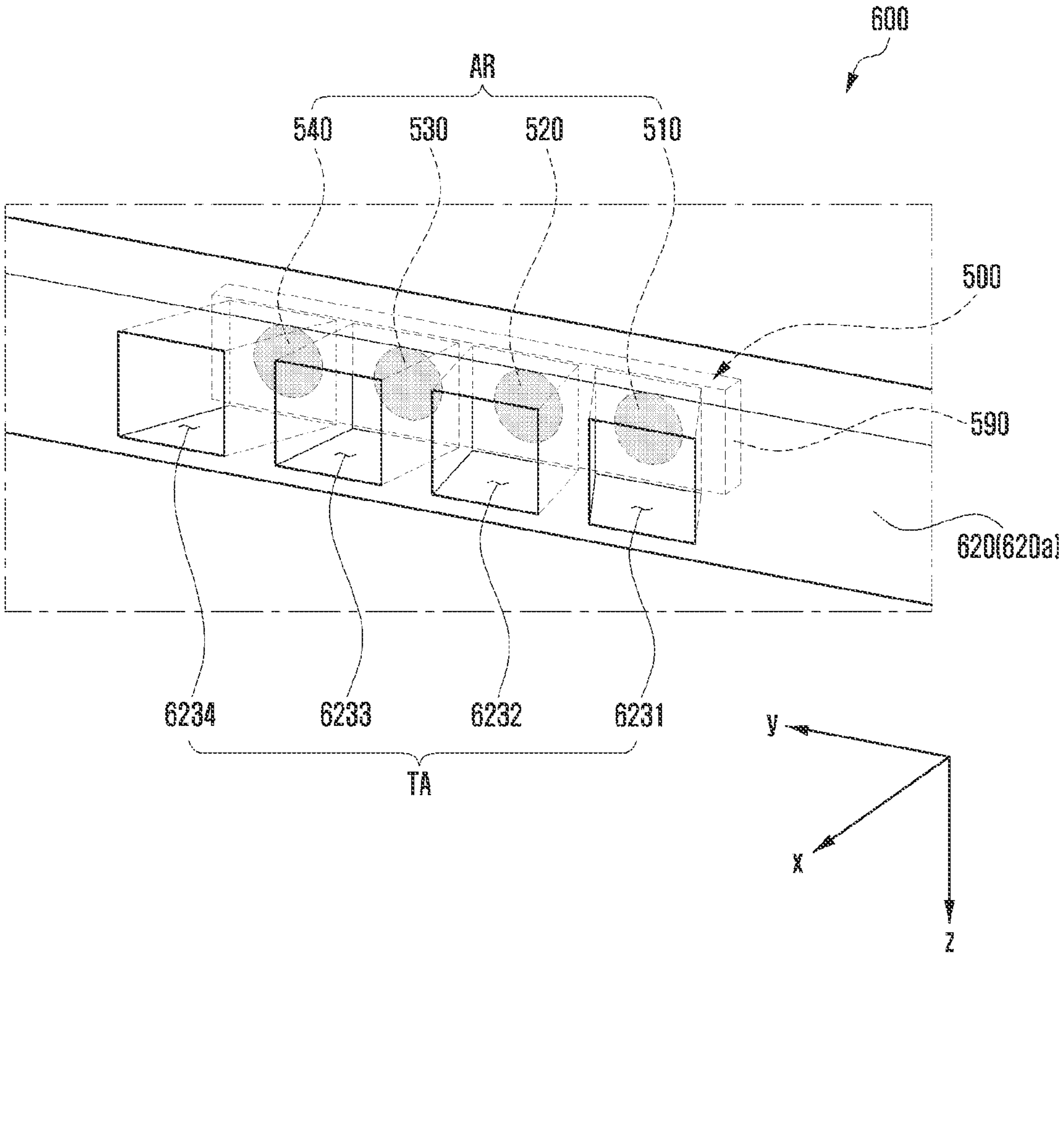
FIG. 6C is a partial perspective view of the electronic device, illustrating an arrangement structure of a lateral member and the antenna structure according to various embodiments.

FIG. 6A is a diagram illustrating an example electronic device in which the antenna structure is disposed according to various embodiments. FIG. 6B is a partial cross-sectional view of the electronic device taken along line 6*b*-6*b* of FIG. 6A according to various embodiments. FIG. 6C is a partial perspective view of the electronic device, illustrating an arrangement structure of a lateral member and the antenna structure according to various embodiments.

The electronic device 600 illustrated in FIGS. 6A and 6B may be at least partially similar to the electronic device 101 illustrated in FIG. 1, the electronic device 200 illustrated in FIG. 2A, and/or the electronic device 300 illustrated in FIG. 3 or include an embodiment of the electronic device.

FIG. 6A is a top plan view illustrating a rear surface of the electronic device in a state in which a rear surface cover (e.g., a rear surface cover 380 in FIG. 6B) is removed.

With reference to FIGS. 6A, 6B and 6C (which may be referred to as FIGS. 6A to 6C), the electronic device 600 (e.g., the electronic device 101 in FIG. 1, the electronic device 200 in FIG. 2A, and/or the electronic device 300 in FIG. 3) may include a housing 610 (e.g., the housing 310 in FIG. 3A, e.g., a housing structure) including: a front surface cover 320 (e.g., the front surface plate 202 in FIG. 2A or the front surface cover 320 in FIG. 3, e.g., a first cover or a first plate); a rear surface cover 380 (e.g., the rear surface plate 211 in FIG. 2A or the rear surface cover 380 in FIG. 3, e.g., a second cover or a second plate) directed in a direction opposite to the direction in which the front surface cover 320 is directed; and a lateral member 620 (e.g., the side surface bezel structure 320 in FIG. 3A or the lateral member 320 in FIG. 3C) configured to surround an inner space 6001 between the front surface cover 320 and the rear surface cover 330. According to an embodiment, the electronic device 600 may include a display 330 disposed in the inner space 6001 of the housing 610 and configured to be visible from the outside through at least a part of the front surface cover 320. According to an embodiment, the display 330 may be disposed to be supported by a support member 6211 (e.g., the first support member 3211 in FIG. 3C) extending from the lateral member 620 and the inner space 6001. According to an embodiment, the lateral member 620 may at least partially include a conductive member 620*a* (e.g., metallic material) and a non-conductive member 620*b* (e.g., polymer material). According to an embodiment, the lateral member 620 may be formed by forming the non-conductive member 620*b* in the conductive member 620*a* by injection molding or by structurally coupling the non-conductive member 620*b* to the conductive member 620*a*.

According to various embodiments, the lateral member 620 may include: a first side surface 6201 having a first length; a second side surface 6202 extending from the first side surface 6201 in a direction perpendicular to the first side surface 6201 and having a second length longer than the first length; a third side surface 6203 extending from the second side surface 6202 in a direction parallel to the first side surface 6201 and having the first length; and a fourth side surface 6204 extending from the third side surface 6203 in a direction parallel to the second side surface 6202 and having the second length.

According to various embodiments, the electronic device 600 may include the antenna structure 500 disposed in the inner space 6001. According to an embodiment, the antenna structure 500 may include the antenna array AR including the plurality of antenna elements (e.g., the plurality of antenna elements 510, 520, 530, and 540 in FIG. 5) and be disposed to form the directional beams in a direction (e.g., an x-axis direction) in which the second side surface 6202 is directed and/or a direction (e.g., a –z-axis direction) in which the rear surface cover 380 is directed. According to an embodiment, the antenna structure 500 may be fixed to at least a part of the lateral member 620 by means of a support bracket 550 (e.g., a conductive support bracket). For example, the non-conductive member 620*b* may be at least partially formed in a corresponding area of the lateral member 620 corresponding to the antenna structure 500 disposed in the inner space 6001 of the electronic device 600 in order to form the beam pattern to the outside of the electronic device 600. According to an embodiment, the antenna structure 500 may be connected to a device substrate 630 disposed in the inner space 6001 of the electronic device 600 by means of an electrical connection member (e.g., a flexible RF cable (PRC)).

According to various embodiments, the electronic device 600 may include the device substrate 630 (a printed circuit board (PCB), e.g., a printed circuit board or a main substrate) disposed in the inner space 6001. According to an embodiment, the device substrate 630 may include at least one wireless communication circuit (e.g., the wireless communication module 192 in FIG. 1) or a power supply unit. According to an embodiment, the device substrate 630 may be electrically connected to the antenna structure 500 through an electrical connection member 560 (e.g., a flexible RF cable (FRC)). According to an embodiment, the electronic device 600 may include a battery B disposed in the vicinity of the device substrate 630 or disposed to at least partially overlap the device substrate 630.

According to various embodiments, the antenna structure 500 may be configured to form the directional beam, in a direction (e.g., the x-axis direction) in which the second side surface 6202 is directed, through a non-conductive portion disposed at a corresponding position on the lateral member 620. According to an embodiment, the lateral member 620 may include a through-hole array TA including a plurality of through-holes 6231, 6232, 6233, and 6234 disposed at predetermined intervals at positions corresponding to the antenna structure 500. According to an embodiment, the plurality of through-holes 6231, 6232, 6233, and 6234 may be disposed at positions approximately corresponding to the antenna elements (e.g., the antenna elements 510, 520, 530, and 540 in FIG. 5). According to an embodiment, the plurality of through-holes 6231, 6232, 6233, and 6234 may be filled with the non-conductive member 620*b*.

According to various embodiments of the present disclosure, the plurality of through-holes 6231, 6232, 6233, and 6234 may be formed in the conductive member 620*a* of the lateral member 620. According to an embodiment, the plurality of through-holes 6231, 6232, 6233, and 6234 may be formed through the lateral member 620 from an inner surface (e.g., an inner surface 621 in FIG. 7) to an outer surface (e.g., an outer surface 622 in FIG. 7). According to an embodiment, when viewed from the inner space 6001 of the electronic device 600, a first interval (e.g., a first interval d1 in FIG. 7) between the plurality of through-holes 6231, 6232, 6233, and 6234 corresponding to the antenna structure 500 may be substantially equal to an interval between the plurality of antenna elements (e.g., the plurality of antenna elements 510, 520, 530, and 540 in FIG. 5). According to an embodiment, when viewed from the outside of the electronic device 600, a second interval (e.g., a second interval d2 in FIG. 7) between the plurality of through-holes 6231, 6232, 6233, and 6234 may be larger than the first interval d1 (refer, e.g., to FIG. 7). For example, the plurality of through-holes 6231, 6232, 6233, and 6234 may be inclined so that the interval increases in a direction from the inner space 6001 to the outside. Therefore, the second interval d2 (refer, e.g., to FIG. 7) between the plurality of through-holes 6231, 6232, 6233, and 6234 is defined to be large in the state in which the interval (e.g., the first interval d1) between the plurality of antenna elements (e.g., the plurality of antenna elements 510, 520, 530, and 540 in FIG. 5) is determined, which may assist in improving radiation performance of the antenna (e.g., increasing the gain). In various embodiments, even though the interval (e.g., the first interval d) between the plurality of antenna elements (e.g., the plurality of antenna elements 510, 520, 530, and 540 in FIG. 5) decreases to reduce a size of the antenna structure 500, a deterioration in radiation performance may be reduced because the second interval d2 between the plurality of through-holes 6231, 6232, 6233, and 6234 decreases relatively less.

Hereinafter, an example arrangement relationship between the plurality of through-holes 6231, 6232, 6233, and 6234 and the antenna structure 500 will be described in greater detail.

Figure 7:
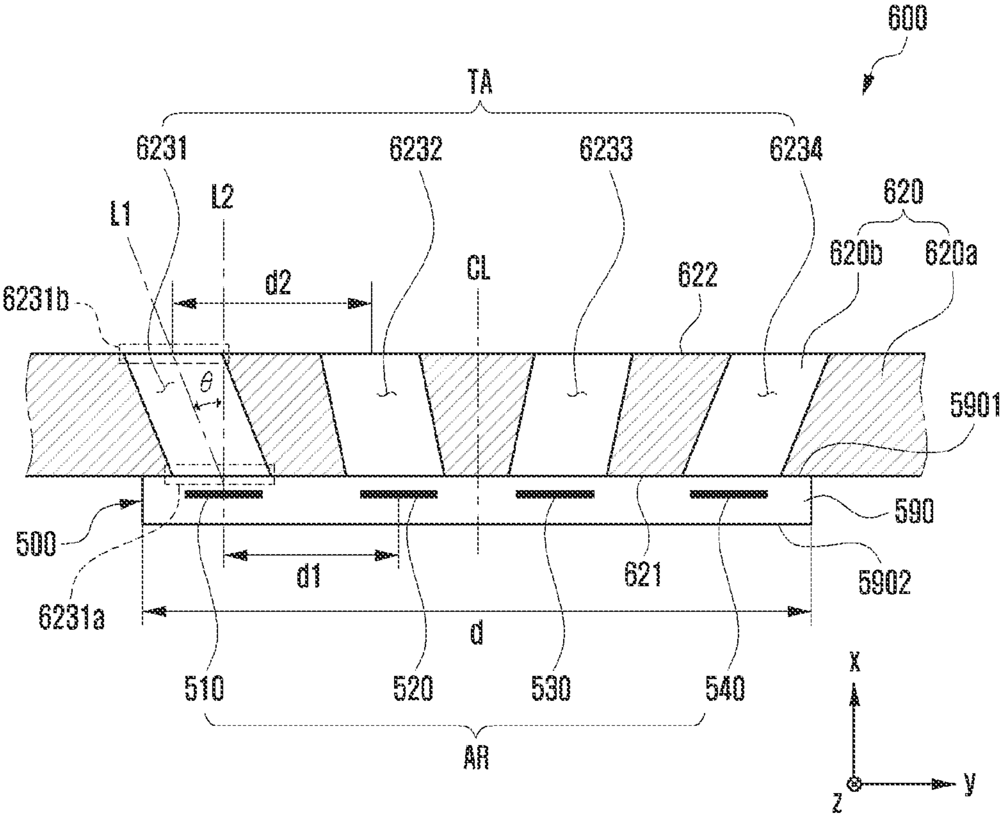
FIG. 7 is a partial cross-sectional view illustrating the arrangement structure of the lateral member and the antenna structure according to various embodiments

FIG. 7 is a partial cross-sectional view of the electronic device, illustrating the arrangement structure of the lateral member and the antenna structure according to various embodiments.

With reference to FIG. 7, the electronic device 600 may include the lateral member 620 including the conductive member 620*a*. According to an embodiment, the electronic device 600 may include the antenna structure 500 disposed in the inner space and directed toward the lateral member 620. According to an embodiment, the antenna structure 500 may include the plurality of antenna elements 510, 520, 530, and 540 at the predetermined first interval d1 at the substrate 590. According to an embodiment, the antenna structure 500 may be disposed to form the directional beam in the direction (e.g., the x-axis direction) of the outer surface 622 from the inner surface 621 using the plurality of through-holes 6231, 6232, 6233, and 6234 formed in the lateral member 620 by means of the antenna array AR including the plurality of antenna elements 510, 520, 530, and 540. For example, the first surface 5901 of the substrate 590 may be disposed to face or be adjacent to the inner surface 621 of the lateral member 620.

According to various embodiments, the lateral member 620 may include the plurality of through-holes 6231, 6232, 6233, and 6234 provided at the predetermined second interval d2 through the conductive member 620*a*. According to an embodiment, the plurality of through-holes 6231, 6232, 6233, and 6234 may be filled with the non-conductive member 620*b*. According to an embodiment, the plurality of through-holes 6231, 6232, 6233, and 6234 may be disposed at the positions respectively and approximately corresponding to the plurality of antenna elements 510, 520, 530, and 540. For example, the first antenna element 510 may be disposed to correspond to the first through-hole 6231, the second antenna element 520 may be disposed to correspond to the second through-hole 6232, the third antenna element 530 may be disposed to correspond to the third through-hole 6233, and the fourth antenna element 540 may be disposed to correspond to the fourth through-hole 6234. According to an embodiment, the plurality of through-holes 6231, 6232, 6233, and 6234 may each include a first opening portion 6231*a* configured to be visible from the inner surface 621 of the lateral member 620, and a second opening portion 6231*b* configured to be visible from the outer surface 622 of the lateral member 620. According to an embodiment, the plurality of through-holes 6231, 6232, 6233, and 6234 may be formed so that the first opening portion 6231*a* and the second opening portion 6231*b* are connected by a tube structure. According to an embodiment, the first opening portion 6231*a* and the second opening portion 6231*b* may have substantially the same size and shape. In various embodiments, the first opening portion 6231*a* and the second opening portion 6231*b* may have different sizes and shapes. According to an embodiment, an interval between the first opening portions 6231*a* of the plurality of through-holes 6231, 6232, 6233, and 6234 may be substantially equal to the first interval d1 between the antenna elements 510, 520, 530, and 540. According to an embodiment, the second interval d2 between the second opening portions 6231*b* of the plurality of through-holes 6231, 6232, 6233, and 6234 may be larger than the first interval d1. According to an embodiment, the plurality of through-holes 6231, 6232, 6233, and 6234 may each have a tube structure changed so that the second interval d2 is larger than the first interval d1. For example, the plurality of through-holes 6231, 6232, 6233, and 6234 may each have a structure inclined leftward or rightward with respect to a center CL of the antenna structure 500. According to an embodiment, the second intervals d2 between the second opening portions 6231*b* of the plurality of through-holes 6231, 6232, 6233, and 6234 may be substantially equal to one another. According to an embodiment, the first interval d1 may refer, for example, to an interval between centers of the antenna elements 510, 520, 530, and 540, and the second interval d2 may refer, for example, to an interval between centers of the second opening portions 6231*b* formed from the outer surface 622 of the lateral member 620. In various embodiments, the first interval d1 may refer, for example, to an interval between the power supply units of the antenna elements 510, 520, 530, and 540. As another example, the first interval d1 may refer, for example, to an interval between centers of the first opening portions 6231*a* of the plurality of through-holes 6231, 6232, 6233, and 6234.

According to various embodiments, the first through-hole 6231, which is disposed at an outermost periphery among the plurality of through-holes 6231, 6232, 6233, and 6234, may be formed so that a first imaginary line L1 connecting the center of the first opening portion 6231*a* and the center of the second opening portion 6231*b* has a gradient with respect to a second imaginary line L2 perpendicular to the substrate 590 so that an angle θ between the first imaginary line L1 and the second imaginary line L2 does not exceed about 45 degrees. Therefore, a gradient of the second through-hole 6232, which is adjacent to the first through-hole 6231 and closer to the center line CL passing through the center of the substrate, may be smaller than a gradient of the first through-hole 6231. According to an embodiment, the angle θ at which the tube of each of the plurality of through-holes 6231, 6232, 6233, and 6234 is formed may increase leftward or rightward in a direction away from the center line CL of the antenna structure 500. According to an embodiment, the fourth through-hole 6234, which is disposed opposite to the first through-hole 6231 based on the center line CL of the substrate 590 among the plurality of through-holes 6231, 6232, 6233, and 6234, may also have the tube structure having substantially the same gradient as the tube structure of the first through-hole 6231 in the opposite direction.

According to various embodiments, the first interval d1 between the plurality of antenna elements 510, 520, 530, and 540 and the second interval d2 between the plurality of through-holes 6231, 6232, 6233, and 6234 may be set so as not to exceed at most λ/2 based on an operating frequency band of the antenna structure 500. For example, in case that the second interval d2 is λ/2, the first interval may be smaller than λ/2, and the length d of the substrate 590 may decrease, which may assist in making the electronic device 600 slim.

FIGS. 8A, 8B, 8C, 8D, 8E, 8F and 8G are partial cross-sectional views of the lateral member including the plurality of through-holes according to various embodiments.

Figure 8A:
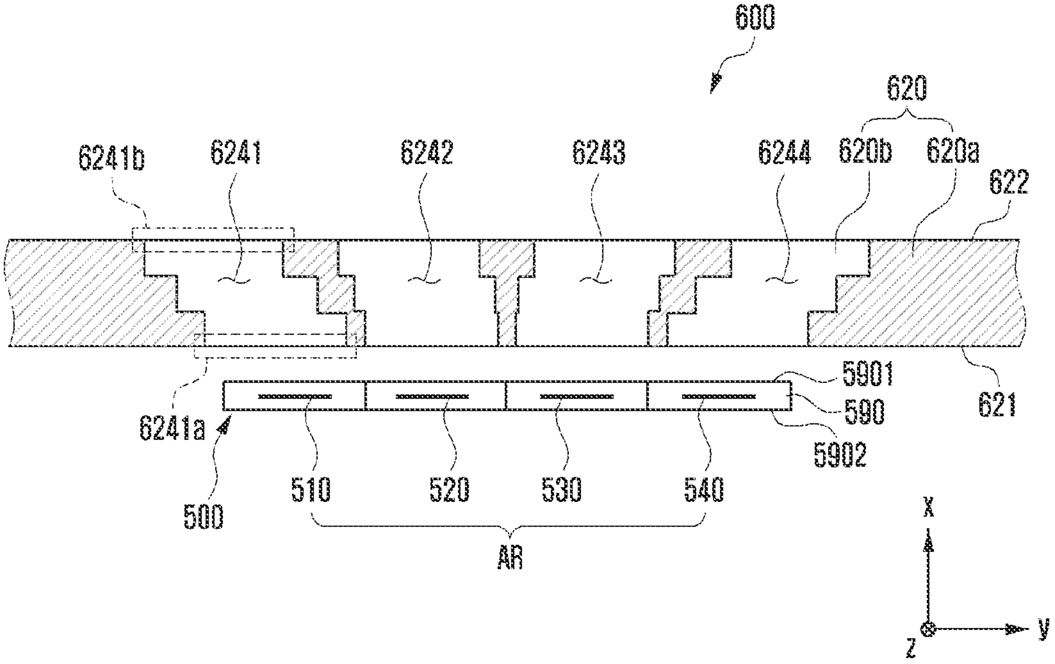
FIGS. 8A, 8B, 8C, 8D, 8E, 8F and 8G are partial cross-sectional views of the lateral member including a plurality of through-holes according to various embodiments.

With reference to FIG. 8A, the electronic device 600 may include the lateral member 620 having the conductive member 620*a* and including a plurality of through-holes 6241, 6242, 6243, and 6244, and the antenna structure 500 disposed in the inner space of the electronic device 600 and corresponding to the plurality of through-holes 6241, 6242, 6243, and 6244. According to an embodiment, the plurality of through-holes 6241, 6242, 6243, and 6244 may be filled with the non-conductive member 620*b*. According to an embodiment, the antenna structure 500 may include the first surface 5901, and the second surface 5902 directed in the direction opposite to the direction in which the first surface 5901 is directed. The antenna structure 500 may include the plurality of antenna elements 510, 520, 530, and 540 disposed in the inner space. According to an embodiment, the substrate 590 may be disposed at the position at which the first surface 5901 faces or is adjacent to the lateral member 620 so that the plurality of antenna elements 510, 520, 530, and 540 respectively corresponds to the plurality of through-holes 6241, 6242, 6243, and 6244.

According to various embodiments, among the plurality of antenna elements 510, 520, 530, and 540, the first antenna element 510 may be disposed at a position corresponding to the first through-hole 6241 among the plurality of through-holes 6241, 6242, 6243, and 6244, the second antenna element 520 may be disposed at a position corresponding to the second through-hole 6242, the third antenna element 530 may be disposed at a position corresponding to the third through-hole 6243, and the fourth antenna element 540 may be disposed at a position corresponding to the fourth through-hole 6244.

According to various embodiments, among the plurality of through-holes 6241, 6242, 6243, and 6244, the first through-hole 6241 may include a first opening portion 6241*a* configured to be visible from the inner surface 621 of the lateral member 620, and a second opening portion 6241*b* configured to be visible from the outer surface 622 of the lateral member 620 and define a tube structure connected to the first opening portion 6241*a*. The second through-hole 6242, the third through-hole 6243, and the fourth through-hole 6244 may also each have a through-structure in which the lateral member 620 is penetrated from the inner surface 621 to the outer surface 622, except for the gradient of the tube, but no reference numeral denotes the through-structure. According to an embodiment, the plurality of through-holes 6241, 6242, 6243, and 6244 may each be inclined in a direction (e.g., the x-axis direction) from the inner surface 621 to the outer surface 622. In this case, the plurality of through-holes 6241, 6242, 6243, and 6244 may be formed in a stepwise manner so as to have at least one stepped portion.

To describe the configuration illustrated in FIGS. 8B, 8C, 8D, 8E, 8F and 8G, the elements, which are substantially the same as the elements in FIG. 8A, will be designated by the same reference numerals, and a detailed description thereof may not be repeated.

Figure 8B:
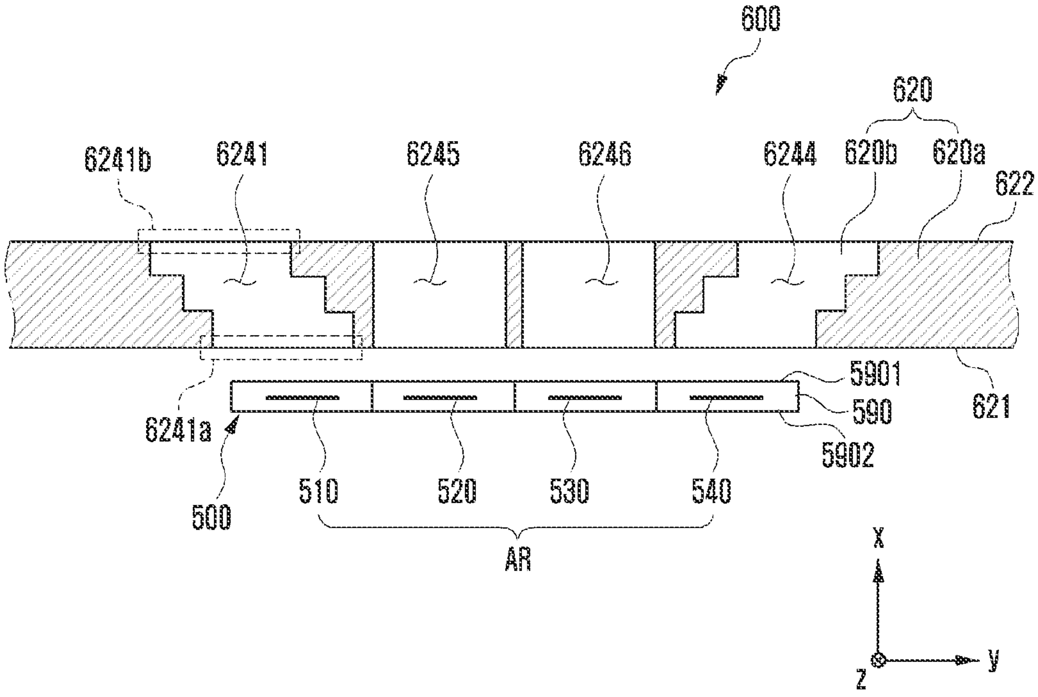

With reference to FIG. 8B, the lateral member 620 may include a plurality of through-holes 6241, 6245, 6246, and 6244 disposed to respectively correspond to the plurality of antenna elements 510, 520, 530, and 540. According to an embodiment, the first and fourth through-holes 6241 and 6244, which are disposed at outermost peripheries among the plurality of through-holes 6241, 6245, 6246, and 6244, may each have a tube structure having a stepped shape inclined outward. According to an embodiment, the second and third through-holes 6245 and 6246, which are disposed at an approximately center among the plurality of through-holes 6241, 6245, 6246, and 6244, may each have a rectilinear tube structure formed in a direction perpendicular to the inner surface 621 and the outer surface 622 without being inclined.

Figure 8C:
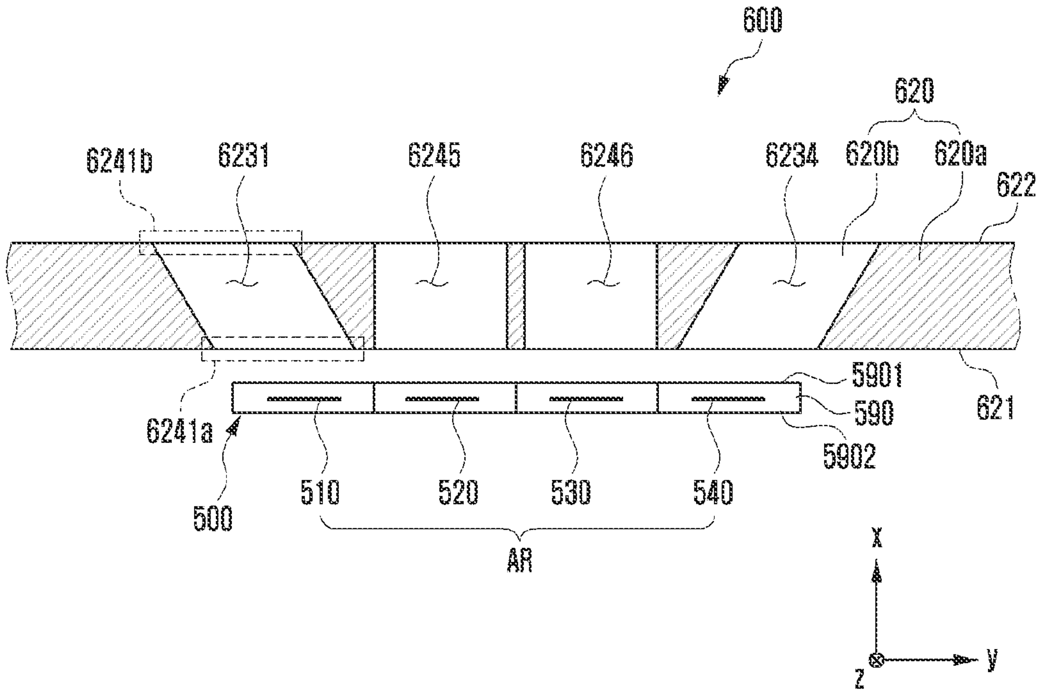

With reference to FIG. 8C, the lateral member 620 may include a plurality of through-holes 6231, 6245, 6246, and 6234 disposed to respectively correspond to the plurality of antenna elements 510, 520, 530, and 540. According to an embodiment, the first and fourth through-holes 6231 and 6234, which are disposed at outermost peripheries among the plurality of through-holes 6231, 6245, 6246, and 6234, may each have a tube structure having a rectilinear shape inclined outward. According to an embodiment, the second and third through-holes 6245 and 6246, which are disposed at an approximately center among the plurality of through-holes 6231, 6245, 6246, and 6234, may each have a rectilinear tube structure formed in a direction perpendicular to the inner surface 621 and the outer surface 622 without being inclined.

Figure 8D:
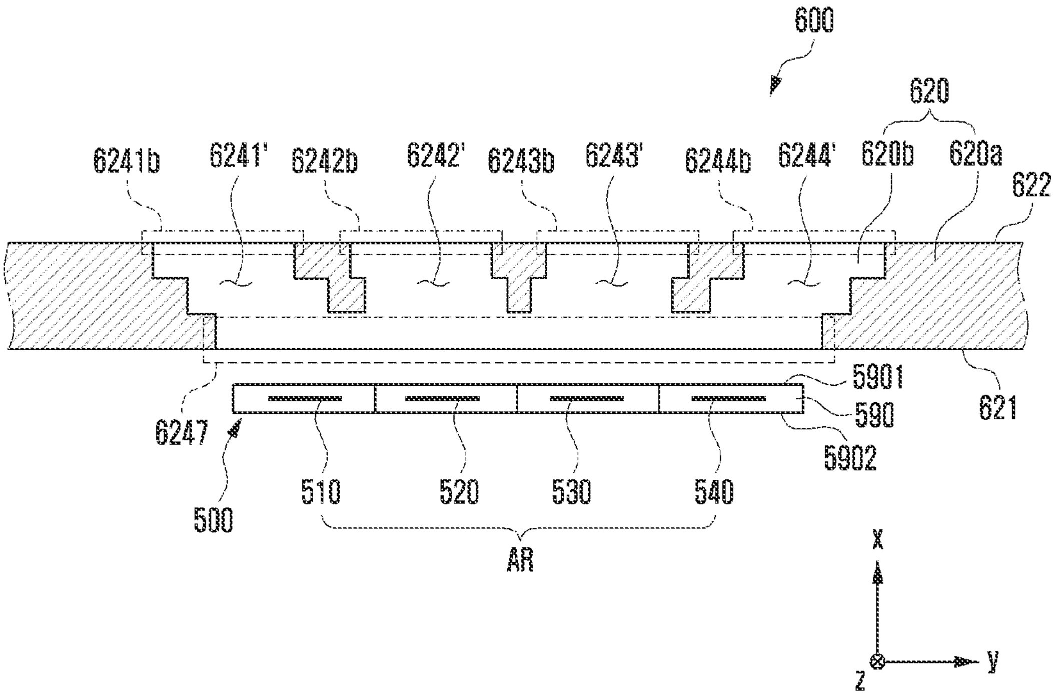

With reference to FIG. 8D, the lateral member 620 may include a plurality of through-holes 6241', 6242', 6243', and

6244' disposed to respectively correspond to the plurality of antenna elements 510, 520, 530, and 540. According to an embodiment, the plurality of through-holes 6241', 6242', 6243', and 6244' may each have a tube structure having a stepped shape inclined leftward or rightward based on the center. According to an embodiment, the plurality of through-holes 6241', 6242', 6243', and 6244' may include a single first opening portion 6247 in which the plurality of through-holes 6241', 6242', 6243', and 6244' is integrated when viewed from the inner surface 621 of the lateral member 620. According to an embodiment, the plurality of through-holes 6241', 6242', 6243', and 6244' may have a plurality of second opening portions 6241*b*, 6242*b*, 6243*b*, and 6244*b* connected to the first opening portion 6247 and configured to separate the plurality of through-holes 6241', 6242', 6243', and 6244' when viewed from the outer surface 622 of the lateral member 620.

Figure 8E:
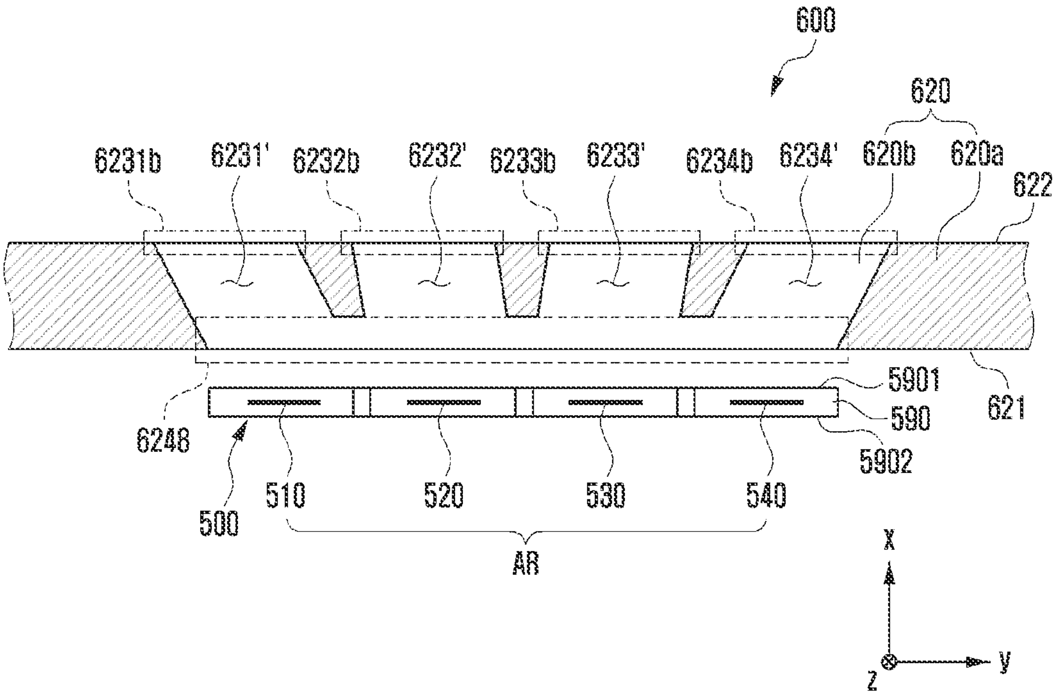

With reference to FIG. 8E, the lateral member 620 may include a plurality of through-holes 6231', 6232', 6233', and 6234' disposed to respectively correspond to the plurality of antenna elements 510, 520, 530, and 540. According to an embodiment, the plurality of through-holes 6231', 6232', 6233', and 6234' may each have a tube structure having a rectilinear shape inclined leftward or rightward based on the center. According to an embodiment, the plurality of through-holes 6231', 6232', 6233', and 6234' may include a single first opening portion 6248 in which the plurality of through-holes 6231', 6232', 6233', and 6234' is integrated when viewed from the inner surface 621 of the lateral member 620. According to an embodiment, the plurality of through-holes 6231', 6232', 6233', and 6234' may have a plurality of second opening portions 6231*b*, 6232*b*, 6233*b*, and 6234*b* connected to the first opening portion 6248 and configured to separate the plurality of through-holes 6231', 6232', 6233', and 6234' when viewed from the outer surface 622 of the lateral member 620.

Figure 8F:
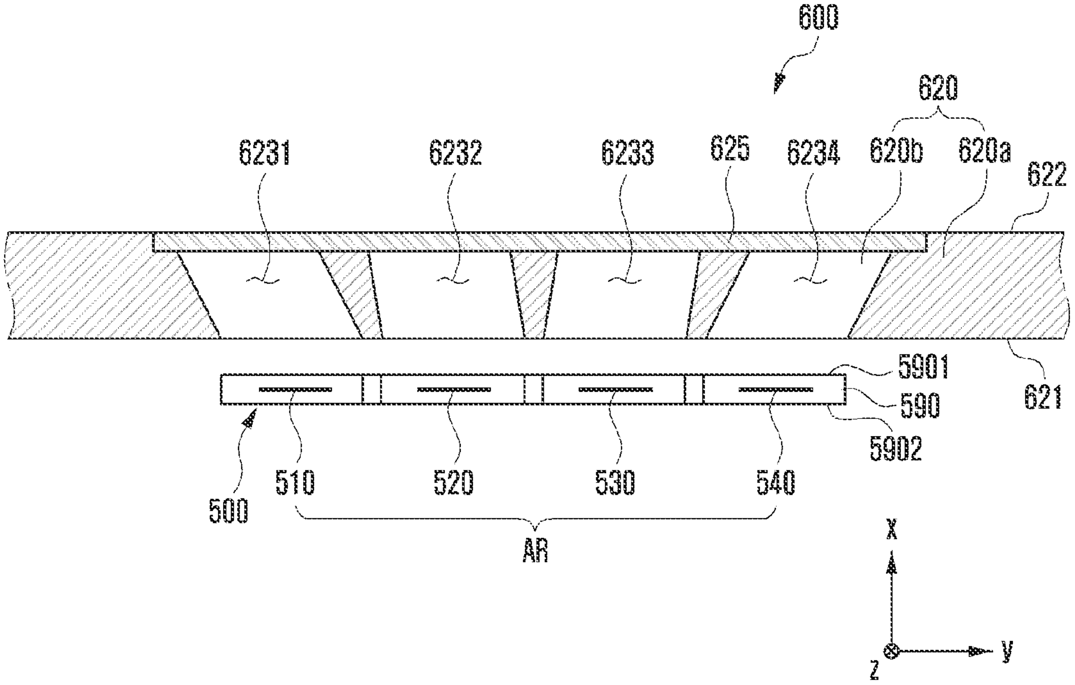

With reference to FIG. 8F, the electronic device 600 may further include a dielectric cover 625 disposed on the outer surface 622 of the lateral member 620 in the structure having the plurality of through-holes 6231, 6232, 6233, and 6234 in FIG. 7. According to an embodiment, the dielectric cover 625 may be disposed to have a size capable of covering all the plurality of through-holes 6231, 6232, 6233, and 6234. According to an embodiment, the dielectric cover 625 may have the same permittivity as the non-conductive member 620*b* or having different permittivity from the non-conductive member 620*b*. According to an embodiment, the permittivity of the dielectric cover 625 may be higher than the permittivity of the non-conductive member 620*b*. For example, the gain of the antenna may be determined based on the permittivity of the non-conductive member 620*b* that fills the plurality of through-holes 6231, 6232, 6233, and 6234, and there is a limitation in applying the injection-molded product having high permittivity to the through-holes. Therefore, the dielectric cover 625 may allow the non-conductive member 620*b* to operate as a high dielectric material, which may assist in improving the gain of the antenna.

Figure 8G:
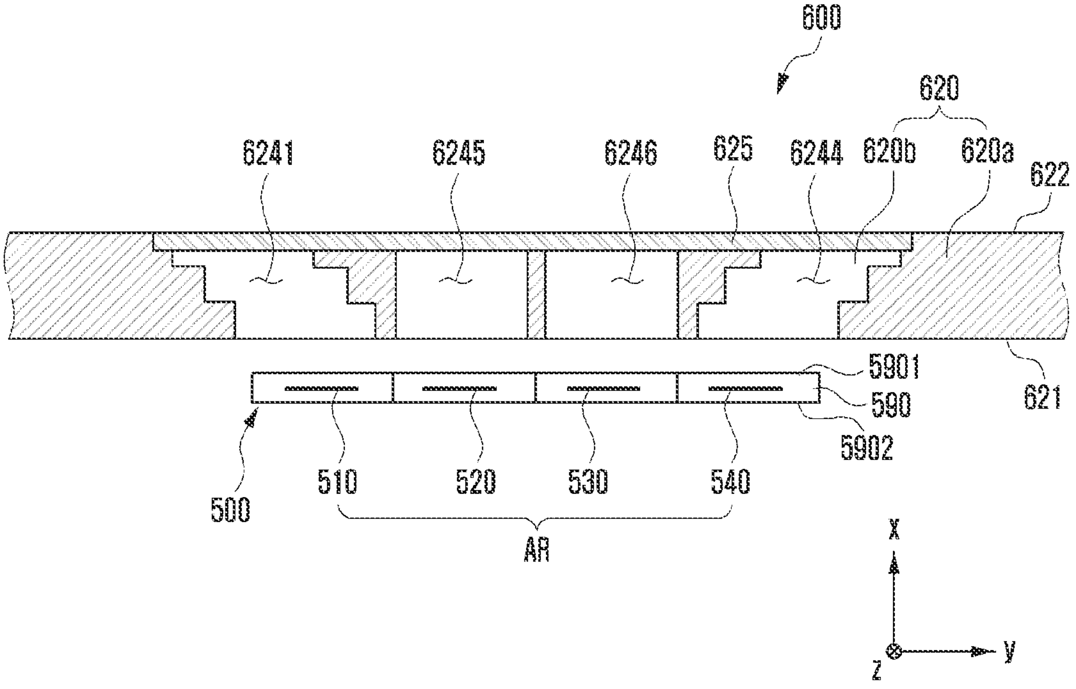

With reference to FIG. 8G, the dielectric cover may also be disposed, in substantially the same way, on the outer surface 622 of the lateral member 620 in the structure having the plurality of through-holes 6241, 6245, 6246, and 6244 in FIG. 8B. Although not illustrated, the dielectric cover 625 may also be disposed on the outer surface 622 of the lateral member 620 even in the structure having the plurality of through-holes in FIGS. 8C, 8D, 8E and 8F.

In various embodiments, the plurality of through-holes may each be tapered so that a space volume thereof gradually increases in the direction from the inner surface 621 to the outer surface 622.

FIGS. 9A, 9B, 9C and 9D are partial cross-sectional views of the lateral member including the plurality of through-holes according to various embodiments.

Figure 9A:
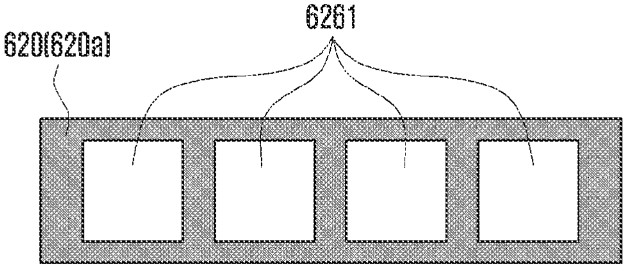
FIGS. 9A, 9B, 9C and 9D are a diagrams illustrating the lateral member including the plurality of through-holes according to various embodiments.
Figure 9B:
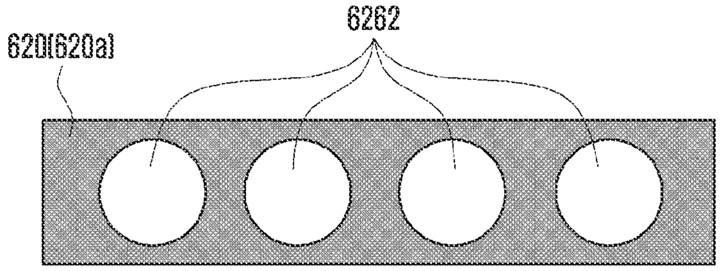
Figure 9C:
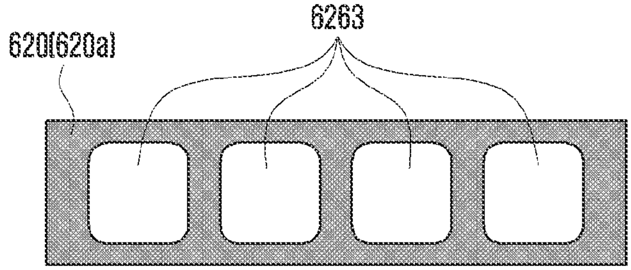
Figure 9D:
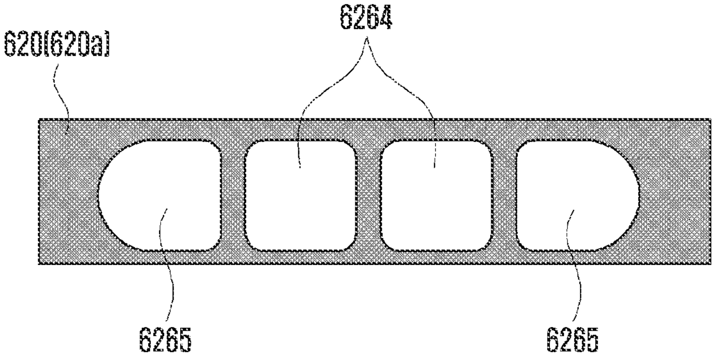

With reference to FIGS. 9A, 9B, 9C and 9D, the lateral member 620 may include a plurality of through-holes 6261, 6262, 6263, 6264, and 6265 formed through the conductive member 620*a*. According to an embodiment, the plurality of through-holes 6261, 6262, 6263, 6264, and 6265 may be formed through the conductive member 620*a* and filled with the non-conductive member 620*b* or formed as cavities. According to an embodiment, as illustrated in FIG. 9A, the plurality of through-holes 6261 may each have a rectangular cross-sectional shape. According to an embodiment, as illustrated in FIG. 9B, the plurality of through-holes 6262 may each have a circular cross-sectional shape. According to an embodiment, as illustrated in FIG. 9C, the plurality of through-holes 6263 may each have a rectangular cross-sectional shape having rounded corners. As illustrated in FIG. 9D, among a plurality of through-holes 6264 and 6265, a cross-section of at least one through-hole 6264 may have a first shape, and a cross-section of each of the remaining through-holes 6265 may have a second shape different from the first shape. Although not illustrated, a cross-section of each of the plurality of through-holes may have various non-illustrated shapes.

Figure 10A:
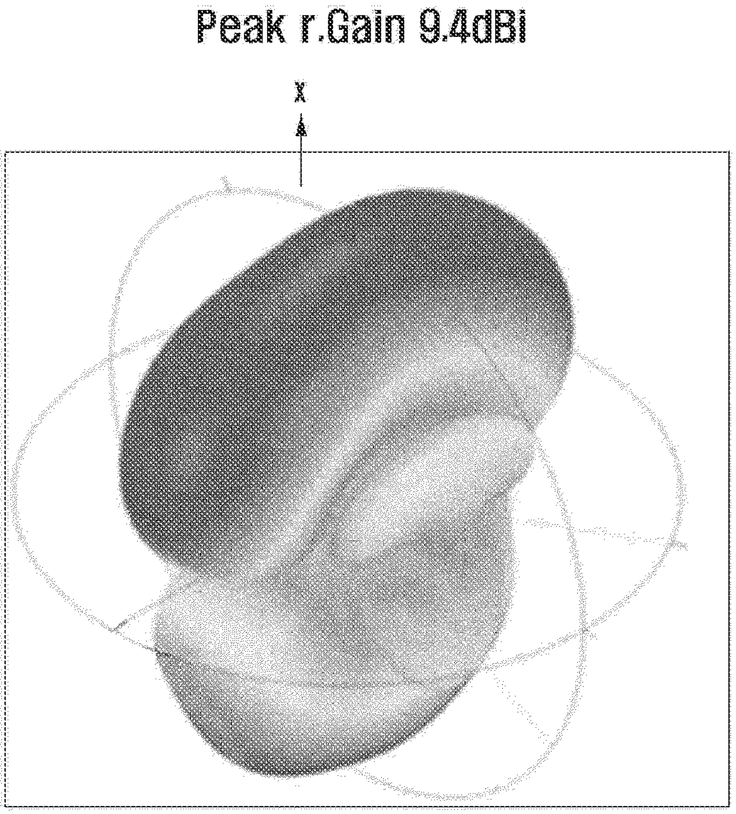
FIGS. 10A and 10B are a diagrams comparing gain characteristics of the antenna implemented by the through-holes according to various embodiments of the present disclosure and through-holes of a comparative example.
Figure 10B:
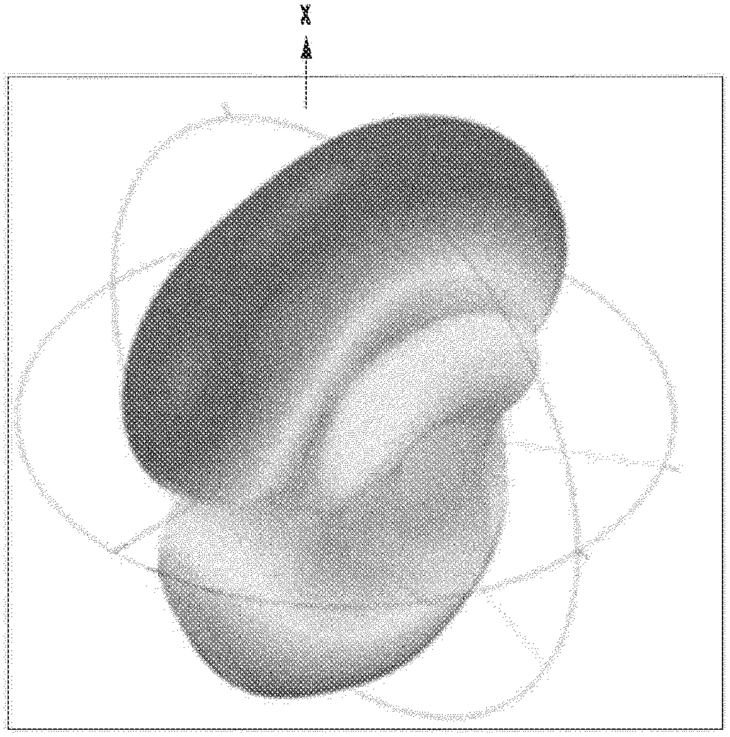

FIGS. 10A and 10B are diagrams comparing gain characteristics of the antenna implemented by the through-holes according to various embodiments and through-holes of a comparative example.

With reference to FIGS. 10A and 10B, a gain is 9.4 dBi (FIG. 10A) in the rectilinear tube structure in which the second interval between the second opening portions of the plurality of through-holes is determined to be substantially equal to the first interval (e.g., the first interval d1 in FIG. 7) between the plurality of antenna elements (e.g., the plurality of antenna elements 510, 520, 530, and 540 in FIG. 7) according to the comparative example. On the other hand, a gain is 9.8 dBi (FIG. 10B) in the tube structure according to various embodiments of the present disclosure in which the second interval (e.g., the second interval d2 in FIG. 7) between the second opening portions (e.g., the second opening portions 6231*b* in FIG. 7) of the plurality of through-holes (e.g., the plurality of through-holes 6231, 6232, 6233, and 6234 in FIG. 7) is determined to be larger than the first interval (e.g., the first interval d1 in FIG. 7) between the plurality of antenna elements (e.g., the plurality of antenna elements 510, 520, 530, and 540 in FIG. 7). Therefore, it can be seen that the radiation performance of the antenna is excellent.

Figure 11A:
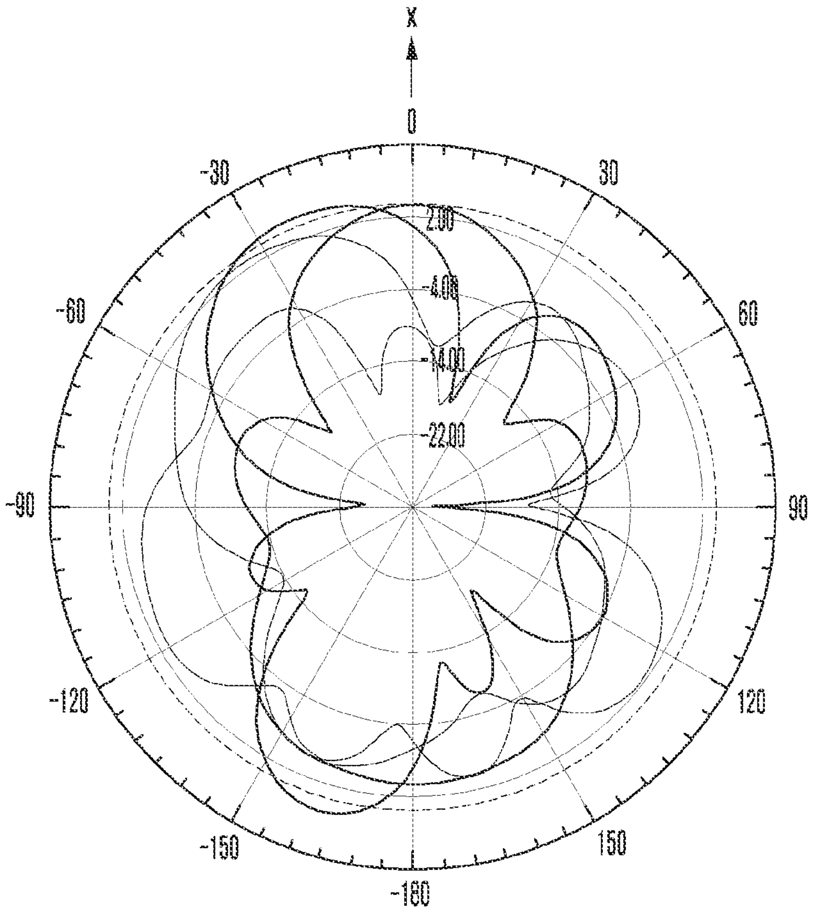
FIGS. 11A and 11B are a graphs illustrating a radiation pattern comparing gain characteristics of the antenna implemented by the through-holes according to various embodiments of the present disclosure and the through-holes of the comparative example.
Figure 11B:
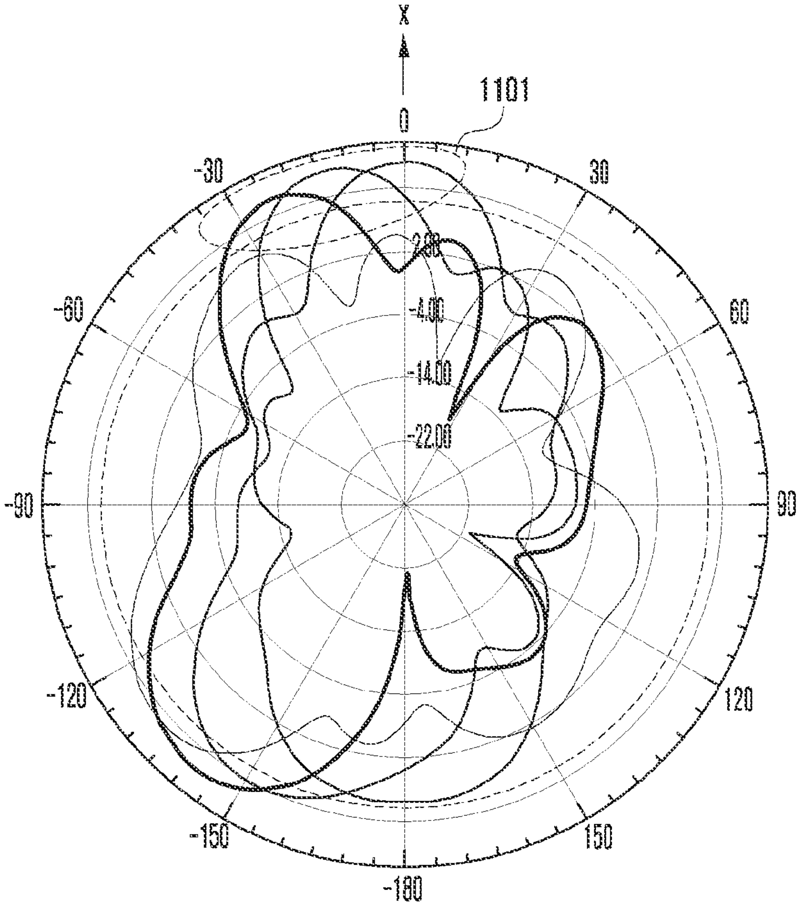

FIGS. 11A and 11B are graphs illustrating radiation pattern views comparing gain characteristics of the antenna implemented by the through-holes according to various embodiments and the through-holes of the comparative example.

With reference to FIGS. 11A and 11B, it can be seen that the gain (FIG. 11B) in the tube structure according to various embodiments of the present disclosure in which the second interval (e.g., the second interval d2 in FIG. 7) between the second opening portions (e.g., the second opening portions 6231*b* in FIG. 7) of the plurality of through-holes (e.g., the plurality of through-holes 6231, 6232, 6233, and 6234 in FIG. 7) is determined to be larger than the first interval (e.g., the first interval d1 in FIG. 7) between the plurality of antenna elements (e.g., the plurality of antenna elements 510, 520, 530, and 540 in FIG. 7) is more excellent in the radial direction (e.g., the x-axis direction) (area 1101) than the gain (FIG. 11A) in the rectilinear tube structure in which the second interval between the second opening portions of the plurality of through-holes is determined to be substantially equal to the first interval (e.g., the first interval d1 in FIG. 7) between the plurality of antenna elements (e.g., the plurality of antenna elements 510, 520, 530, and 540 in FIG. 7) according to the comparative example.

Figure 12A:
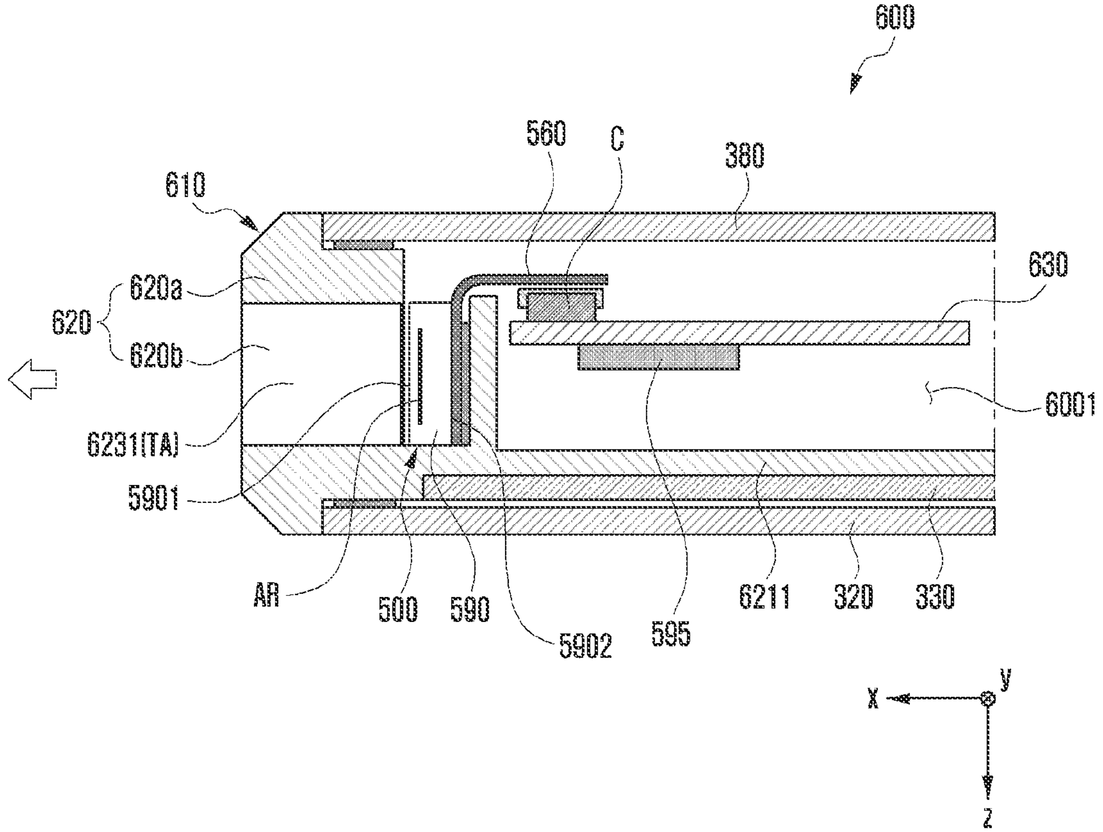
FIGS. 12A, 12B and 12C are partial cross-sectional views of the electronic device including the antenna structure disposed using the plurality of through-holes according to various embodiments.
Figure 12B:
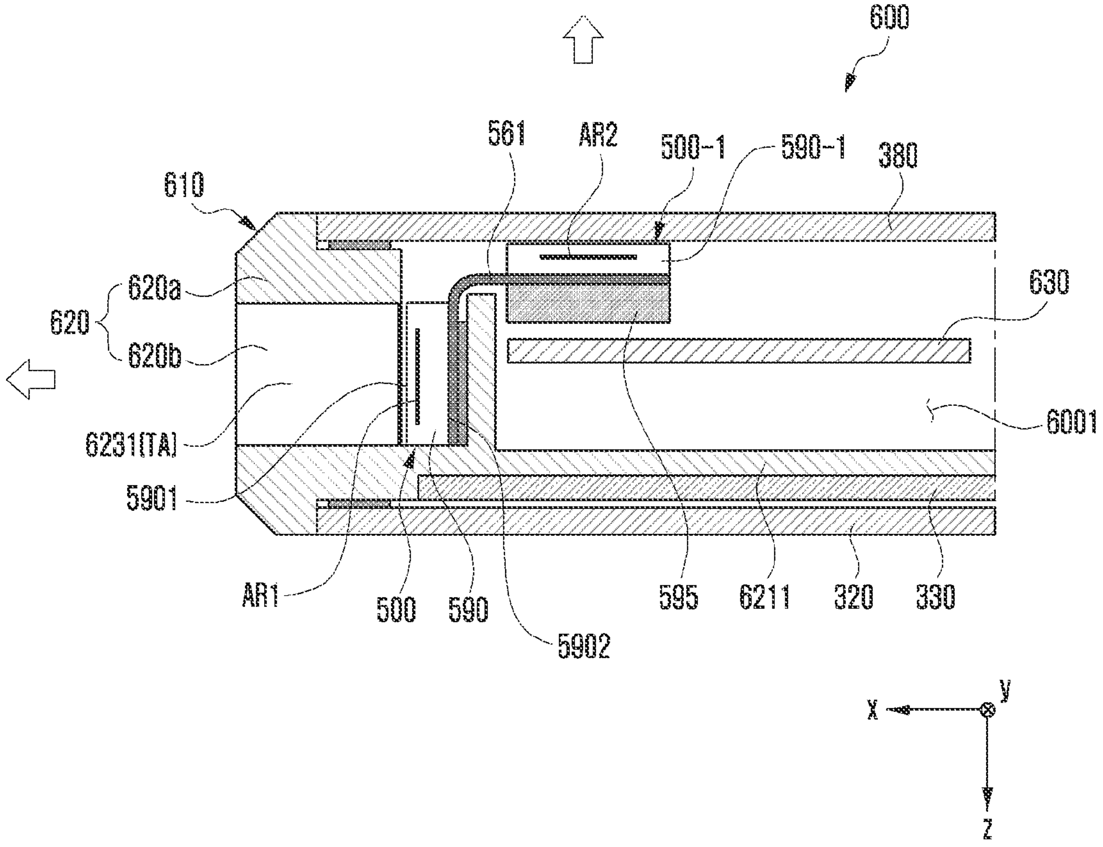
Figure 12C:
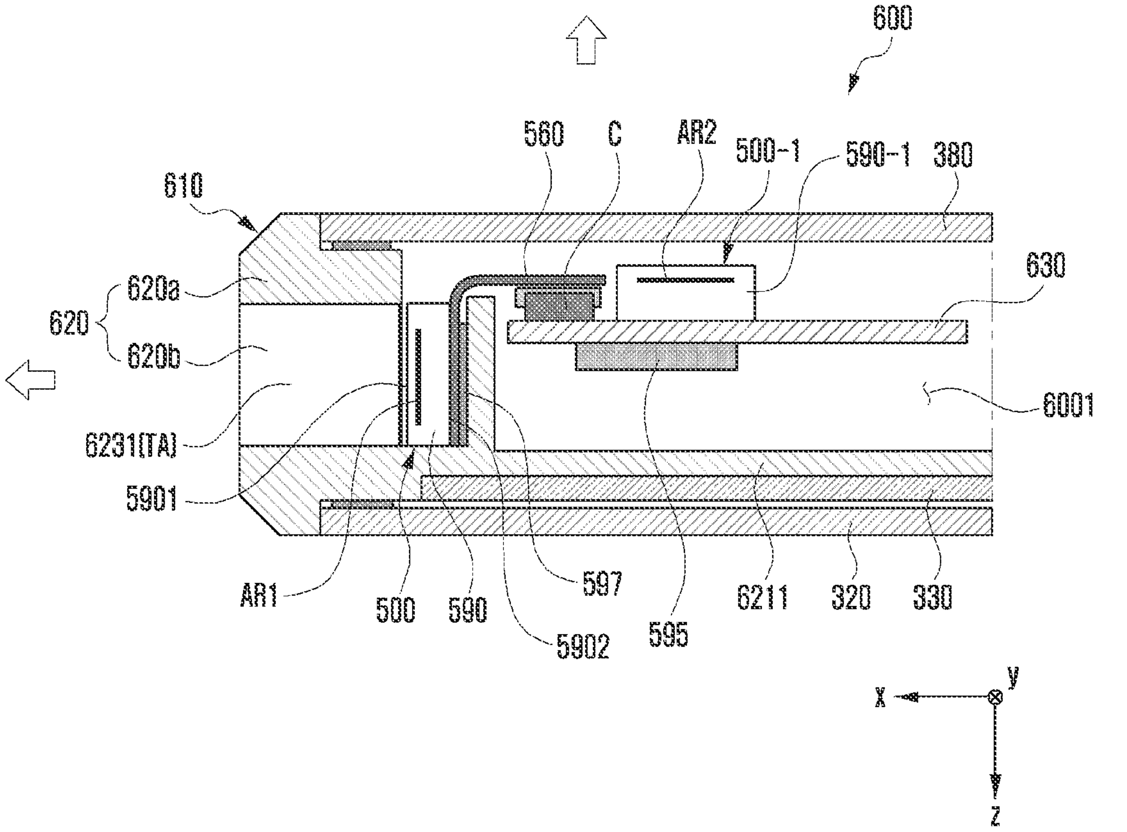

FIGS. 12A, 12B and 12C are partial cross-sectional views of the electronic device including the antenna structure disposed using the plurality of through-holes according to various embodiments.

To describe the electronic device in FIGS. 12A, 12B and 12C, the elements, which are substantially the same as the elements of the electronic device in FIG. 6B, will be designated by the same reference numerals, and a detailed description thereof may not be repeated.

With reference to FIG. 12A, the electronic device 600 may be disposed so that the substrate 590 including the antenna array AR forms the directional beam in an outward direction (e.g., the x-axis direction), in which the lateral member 620 is directed, by means of the through-hole array TA disposed on the lateral member 620. In this case, the wireless communication circuit 595 may be disposed on the device substrate 630, and the substrate 590 may be electrically connected to the device substrate 630 through the electrical connection member 560 (e.g., the FRC) including a connector C.

With reference to FIG. 12B, the electronic device 600 may include a first antenna structure 500 including a first substrate 590 on which a first antenna array AR1 is disposed, a second antenna structure 500-1 including a second substrate 590-1 on which a second antenna array AR2 is disposed, and an electrical connection member 561 configured to connect the first antenna structure 500 and the second antenna structure 500-1. According to an embodiment, the first antenna structure 500 may be disposed to form the directional beam in the outward direction (e.g., the x-axis direction) in which the lateral member 620 is directed. According to an embodiment, the second antenna structure 500-1 may be disposed to form the directional beam in the outward direction (e.g., the −z-axis direction) in which the rear surface cover 380 is directed. In the embodiment, the wireless communication circuit 595 may be disposed on the second substrate 590-1. In various embodiments, the wireless communication circuit 595 may be disposed on the first substrate 590.

With reference to FIG. 12C, the electronic device 600 may include the first antenna structure 500 including the first substrate 590 on which the first antenna array AR1 is disposed, the second antenna structure 500-1 including the second substrate 590-1 on which the second antenna array AR2 is disposed, and the electrical connection member 560 configured to connect the first antenna structure 500 and the second antenna structure 500-1. According to an embodiment, the second substrate 590-1 may be disposed on the device substrate 630. According to an embodiment, the first substrate 590 may be electrically connected to the device substrate 630 through the electrical connection member 560. According to an embodiment, the first antenna structure 500 may be disposed to form the directional beam in the outward direction (e.g., the x-axis direction) in which the lateral member 620 is directed. According to an embodiment, the second antenna structure 500-1 may be disposed to form the directional beam in the outward direction (e.g., the −z-axis direction) in which the rear surface cover 380 is directed. In this case, the wireless communication circuit 595 may be disposed on the device substrate 630.

Figure 13A:
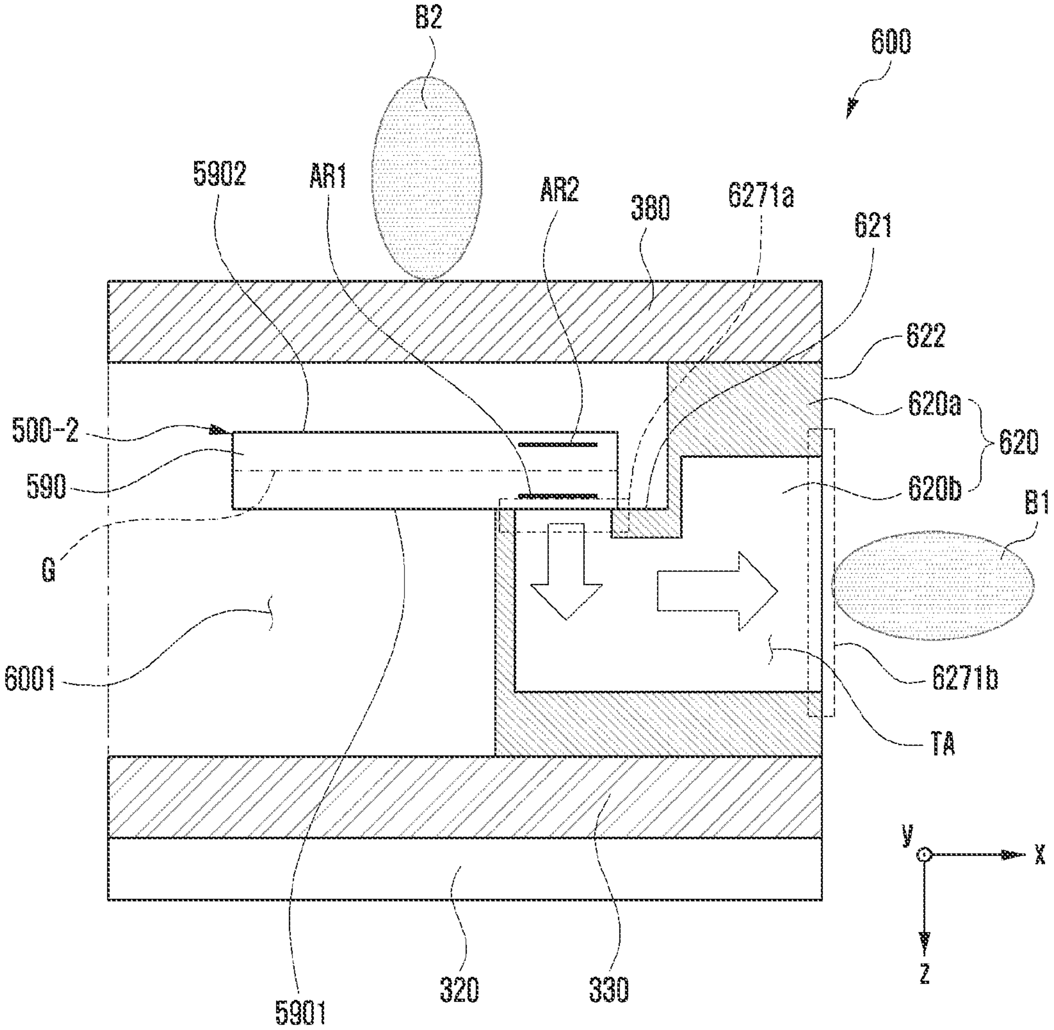
FIG. 13A is a partial cross-sectional view of the electronic device including the antenna structure disposed using the plurality of through-holes according to various embodiments.
Figure 13B:
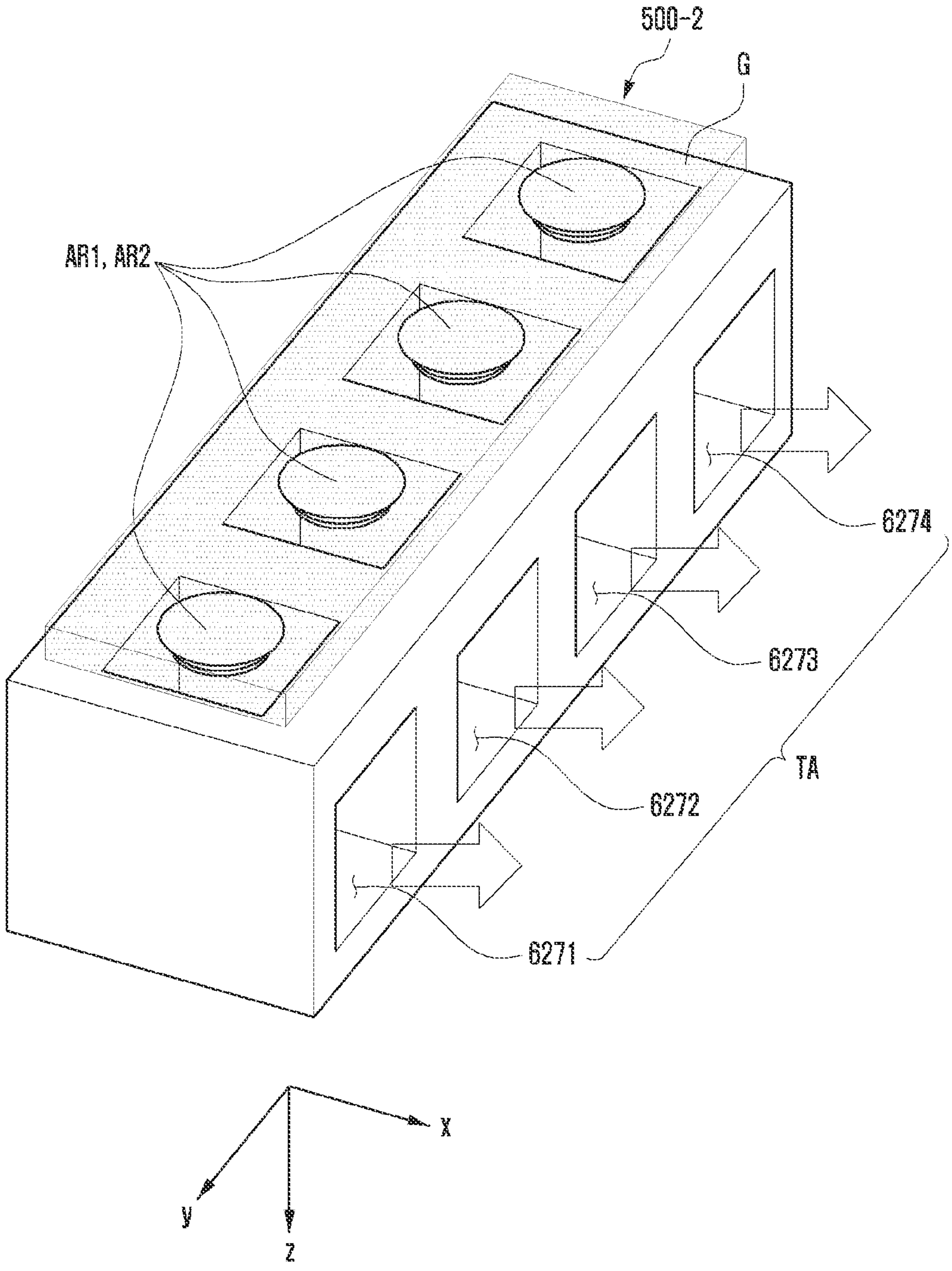
FIG. 13B is a partial perspective view illustrating the arrangement structure of the antenna structure and the lateral member including the plurality of through-holes according to various embodiments.

FIG. 13A is a partial cross-sectional view of the electronic device including the antenna structure disposed using the plurality of through-holes according to various embodiments. FIG. 13B is a partial perspective view illustrating the arrangement structure of the antenna structure and the lateral member including the plurality of through-holes according to various embodiments.

Referring to FIGS. 13A and 13B, the electronic device 600 (e.g., the electronic device 101 in FIG. 1, the electronic device 200 in FIG. 2A, and/or the electronic device 300 in FIG. 3) may include the housing 610 (e.g., the housing 310 in FIG. 3A, e.g., the housing structure) including: the front surface cover 320 (e.g., the front surface plate 202 in FIG. 2A or the front surface cover 320 in FIG. 3, e.g., the first cover or the first plate); the rear surface cover 380 (e.g., the rear surface plate 211 in FIG. 2A or the rear surface cover 380 in FIG. 3, e.g., the second cover or the second plate) directed in the direction opposite to the direction in which the front surface cover 320 is directed; and the lateral member 620 (e.g., the side surface bezel structure 320 in FIG. 3A or the lateral member 320 in FIG. 3C) configured to surround the inner space 6001 between the front surface cover 320 and the rear surface cover 330. According to an embodiment, the electronic device 600 may include the display 330 disposed in the inner space 6001 of the housing 610 and configured to be visible from the outside through at least a part of the front surface cover 320. According to an embodiment, the display 330 may be disposed to be supported by the support member 6211 (e.g., the first support member 3211 in FIG. 3C) extending from the lateral member 620 and the inner space 6001. According to an embodiment, the lateral member 620 may at least partially include the conductive member 620*a* (e.g., metallic material) and the non-conductive member 620*b* (e.g., polymer material). According to an embodiment, the lateral member 620 may be formed by forming the non-conductive member 620*b* in the conductive member 620*a* by injection molding or by structurally coupling the non-conductive member 620*b* to the conductive member 620*a*.

According to various embodiments, the electronic device 600 may include: the substrate 590 including the first surface 5901 and the second surface 5902 directed in the direction opposite to the direction in which the first surface 5901 is directed; the first antenna array AR1 disposed to be close to the first surface 5901 based on a ground layer G disposed at the substrate 590; and an antenna structure 500-2 including the second antenna array AR2 disposed to be close to the second surface 5902. According to an embodiment, the first antenna array AR1 and the second antenna array AR2 may include the plurality of antenna elements 510, 520, 530, 540, and 550 illustrated in FIG. 5.

According to various embodiments, the electronic device 600 may include the through-hole array TA formed through the conductive member 620*a* of the lateral member 620. The through-hole array TA may include a plurality of through-holes 6271, 6272, 6273, and 6247. According to an embodiment, the through-hole array TA may be filled with the non-conductive member 620*b*. According to an embodiment, each of the plurality of through-holes 6271, 6272, 6273, and 6247 of the through-hole array TA may include a first opening portion 6271*a* disposed on the inner surface 621 of the lateral member 620 and corresponding to the first antenna array AR1, and a second opening portion 6271*b* connected to the first opening portion 6271*a* and formed in the outer surface 622 of the lateral member 620. The through-hole array TA formed through the first opening portion 6271*a* and the second opening portion 6271*b* may have a bent shape. Therefore, the first antenna array AR1 of the antenna structure 500-2, which is disposed to form the directional beam in the direction (e.g., the z-axis direction) in which the display 330 is directed, may form a directional beam B1, in the outward direction (e.g., the x-axis direction) in which the lateral member 620 is directed, by means of the through-hole array TA. According to an embodiment, the second antenna array AR2 of the antenna structure 500-2 may form a directional beam B2 in the direction (e.g., the −z-axis direction) in which the rear surface cover 380 is directed.

Figure 13C:
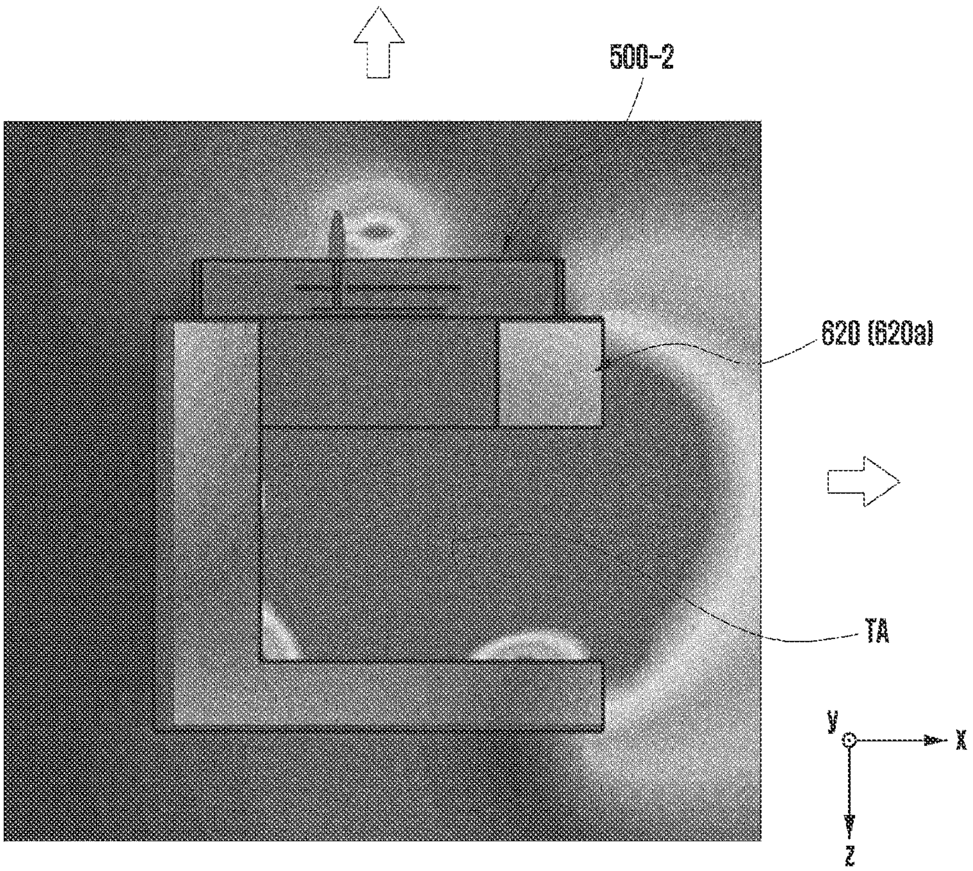
FIG. 13C is a diagram illustrating an electric field distribution of the antenna structure in FIG. 13A according to various embodiments.

FIG. 13C is a diagram illustrating an electric field distribution of the antenna structure 500-2 in FIG. 13A according to various embodiments. It can be seen that the antenna structure 500-2 may perform smooth radiation as the electric field distribution is formed by the through-hole array TA in the direction (e.g., the x-axis direction) in which the lateral member 620 is directed and the direction (e.g., the −z-axis direction) in which the rear surface cover 380 is directed.

Figure 14A:
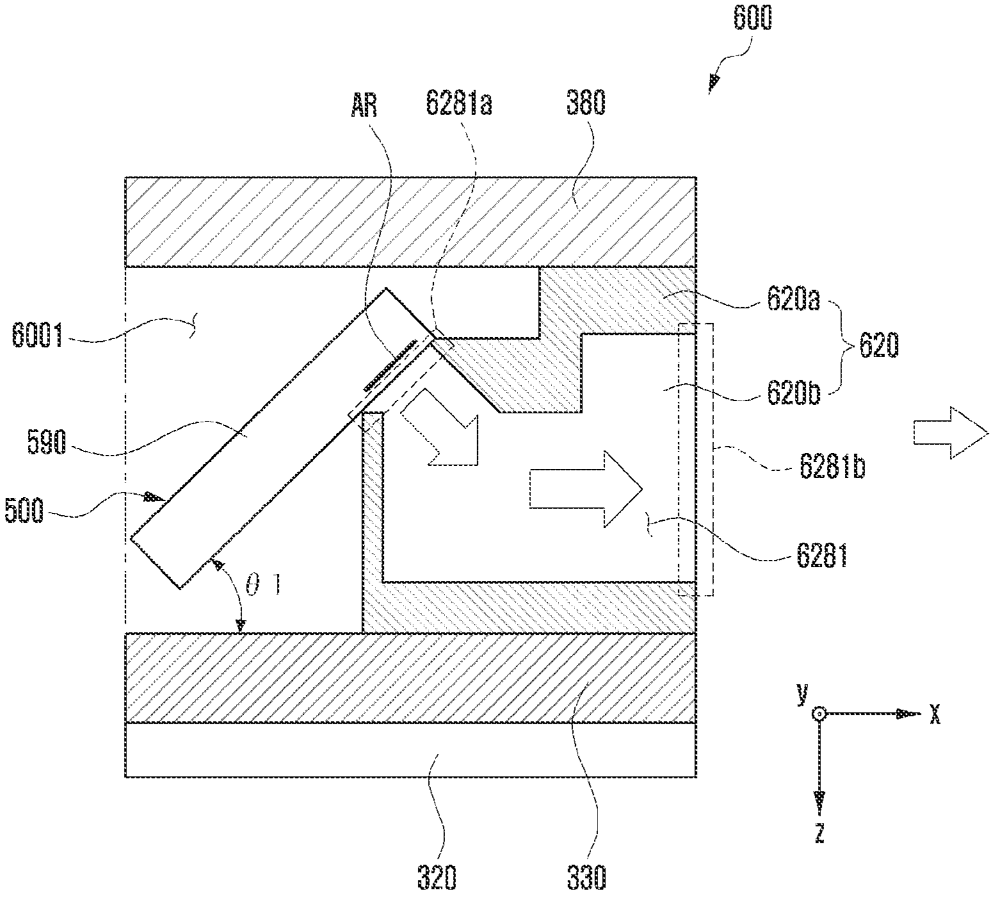
FIGS. 14A and 14B are partial cross-sectional views of the electronic device including the antenna structure disposed using the plurality of through-holes according to various embodiments.
Figure 14B:
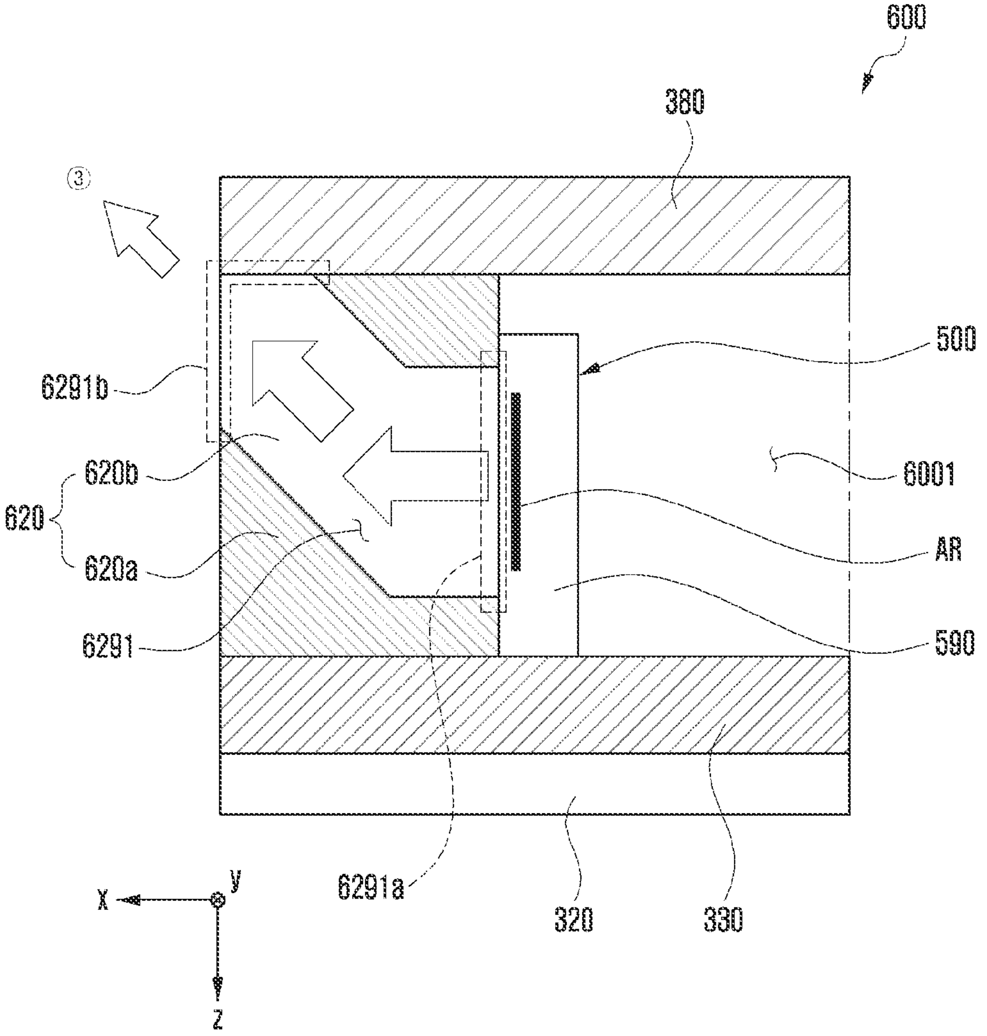

FIGS. 14A and 14B are partial cross-sectional views of the electronic device including the antenna structure disposed using the plurality of through-holes according to various embodiments.

With reference to FIG. 14A, the substrate 590 of the antenna structure 500 is disposed in various ways by changing the shape of the through-hole 6281 formed in the lateral member 620, which may assist in arranging and designing the electronic device 600. For example, the through-hole 6281 may include a first opening portion 6281*a* corresponding to the inner space 6001, and a second opening portion 6281*b* connected to the first opening portion 6281*a* and corresponding to an external environment. According to an embodiment, the through-hole 6281 formed through the first opening portion 6281*a* and the second opening portion 6281*b* may have a structure that forms the directional beam in the direction (e.g., the x-axis direction) in which the lateral member 620 is directed even though the substrate 590 is disposed obliquely. With this structure, the substrate 590 of the antenna structure 500 is disposed to have an inclination structure inclined at a predetermined angle θ1 from the front surface cover 320, which may assist in arranging and designing the components of the electronic device 600.

With reference to FIG. 14B, the electronic device 600 may include a through-hole 6291 including a first opening portion 6291*a* corresponding to the inner space 6001, and a second opening portion 6291*b* corresponding to an external environment. According to an embodiment, the second opening portion 6291*b* may be formed to be directed in a diagonal direction (direction ③) between the direction (e.g., the x-axis direction) in which the lateral member 620 is directed and the direction (e.g., the −z-axis direction) in which the rear surface cover 380 is directed. As another example, the second opening portion 6291*b* may be filled with the non-conductive member 620*b* so as to have a shape corresponding to a shape of the lateral member 620. According to an embodiment, the substrate 590 of the antenna structure 500 corresponding to the first opening portion 6291*a* may be disposed in a direction perpendicular to the front surface cover 320. According to an embodiment, at least a part of the second opening portion 6291*b* may be formed to correspond to the direction (e.g., the x-axis direction) in which the lateral member 620 is directed, and the remaining part of the second opening portion 6291*b* may be formed to correspond to the direction (e.g., the −z-axis direction) in which the rear surface cover 380 is directed. In this case, the antenna structure 500 may be configured to form the directional beam in the diagonal direction (direction ③) between the direction (e.g., the x-axis direction) in which the lateral member 620 is directed and the direction (e.g., the −z-axis direction) in which the rear surface cover 380 is directed.

Figure 15A:
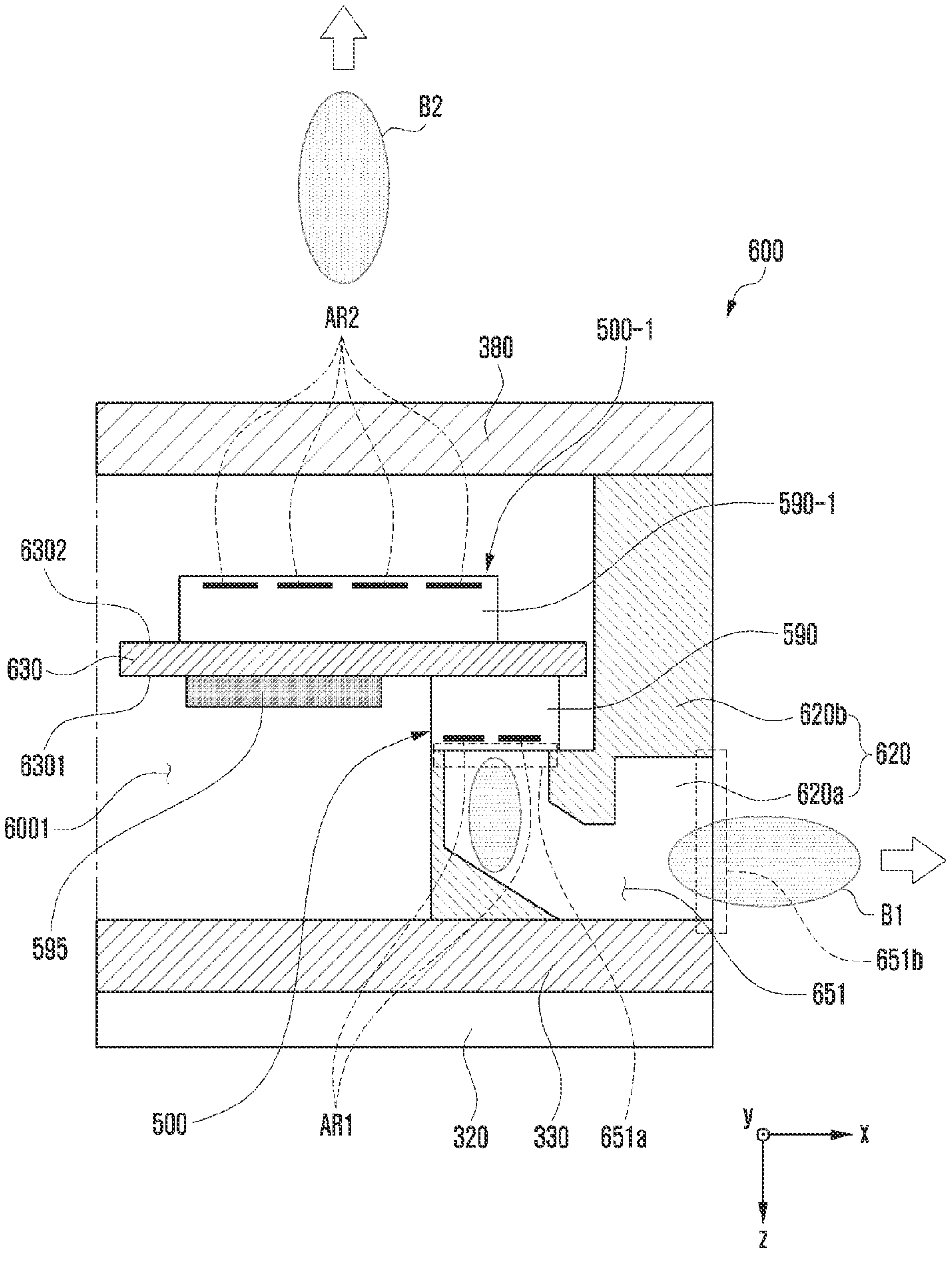
FIGS. 15A, 15B and 15C are partial cross-sectional views of the electronic device including the antenna structure disposed using the plurality of through-holes according to various embodiments.
Figure 15B:
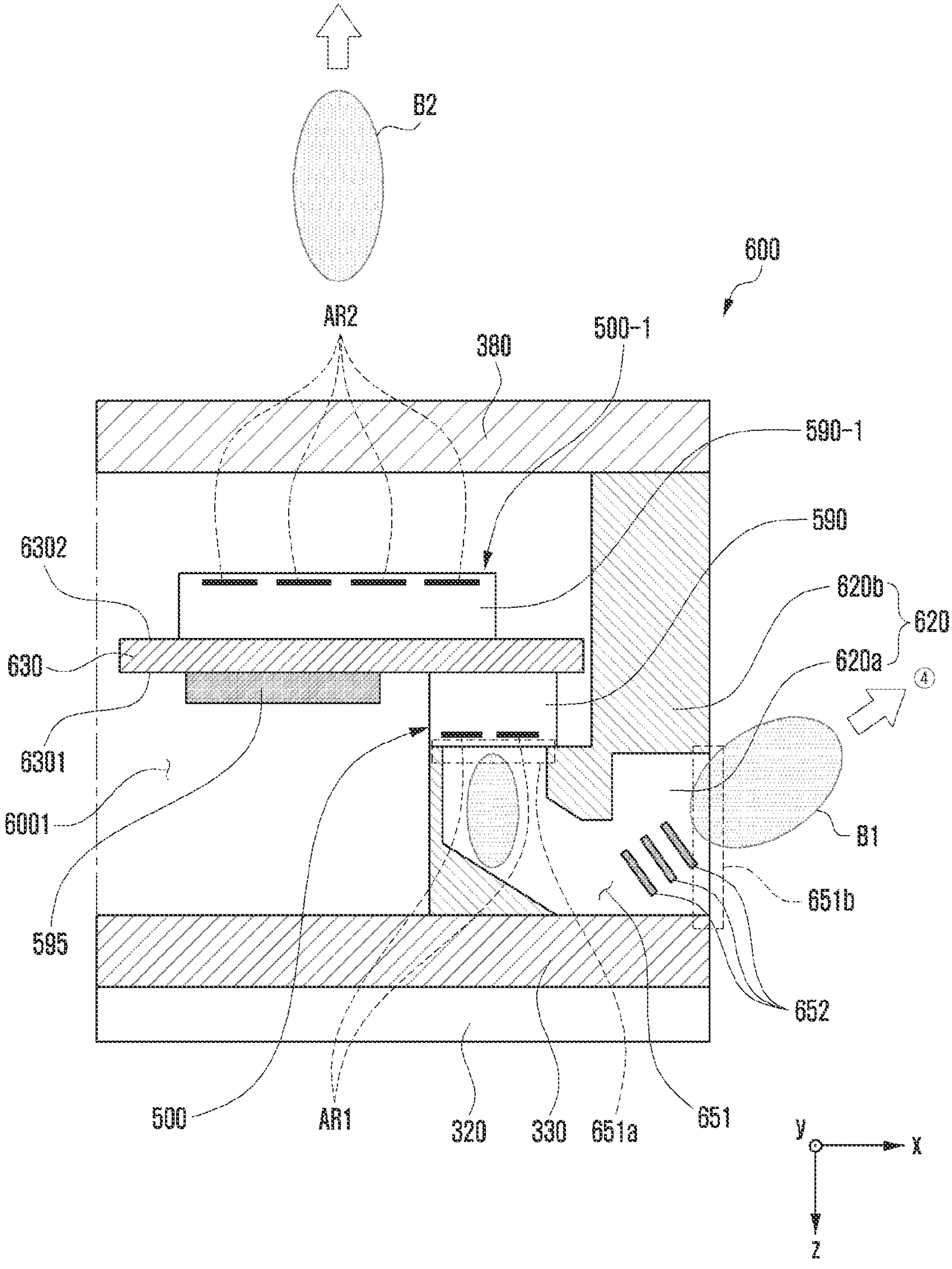
Figure 15C:
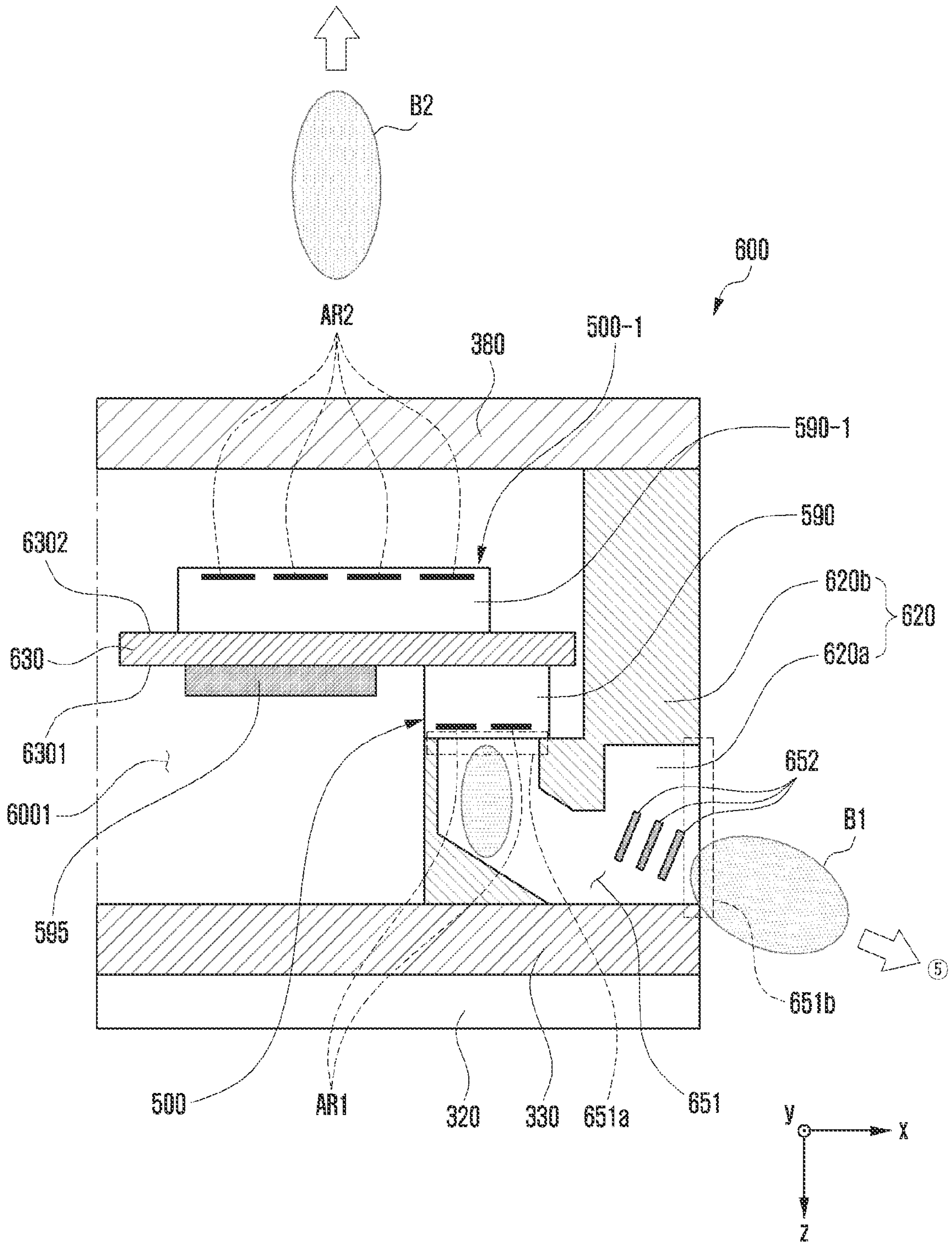

FIGS. 15A, 15B and 15C are partial cross-sectional views of the electronic device including the antenna structure disposed using the plurality of through-holes according to various embodiments.

With reference to FIG. 15A, the electronic device 600 may include the first antenna structure 500 including the first substrate 590 on which the first antenna array AR1 is disposed, and the second antenna structure 500-1 including the second substrate 590-1 on which the second antenna array AR2 is disposed. According to an embodiment, the electronic device 600 may be disposed in the inner space 6001 and include the device substrate 630 including a first substrate surface 6301, and a second substrate surface 6302 directed in a direction opposite to the direction in which the first substrate surface 6301 is directed. According to an embodiment, the first substrate of the first antenna structure 500 may be disposed on the first substrate surface 6301 of the device substrate 630. According to an embodiment, the second substrate 590-1 of the second antenna structure 500-1 may be disposed on the second substrate surface 6302 of the device substrate 630. According to an embodiment, the wireless communication circuit 595 may be disposed on the device substrate 630.

According to various embodiments, the electronic device 600 may include a through-hole 651 formed through the lateral member 620 to connect the inner space 6001 and the external environment. According to an embodiment, the through-hole 651 may include a first opening portion 651*a* disposed in the inner space 6001 and corresponding to the first antenna structure 500, and a second opening portion 651*b* connected to the first opening portion 651*a* and disposed to correspond to the external environment. For example, the first antenna structure 500, which is disposed to form the directional beam in the direction (e.g., z-axis direction) in which the display 330 is directed, may form the directional beam B1, in the direction (e.g., the x-axis direction) in which the lateral member 620 is directed, through the through-hole 651. The second antenna structure 500-1 may form the directional beam B2 in the direction (e.g., the −z-axis direction) in which the rear surface cover 380 is directed.

With reference to FIGS. 15B and 15C, the electronic device 600 may further include a director 652 disposed between the first opening portion 651*a* and the second opening portion 651*b*. According to an embodiment, the director 652 may change a direction of radiation of the directional beam B1 formed from the first antenna structure 500. For example, as illustrated in FIG. 15B, the directional beam B1 radiated from the first antenna structure 500 may be formed by the director 652 in a diagonal direction (direction ④) between the direction (e.g., the x-axis direction) in which the lateral member 620 is directed and the direction (e.g., the −z-axis direction) in which the rear surface cover 380 is directed. As illustrated in FIG. 15C, the directional beam B1 radiated from the first antenna structure 500 may be formed by the director 652 in a diagonal direction (direction ⑤) between the direction (e.g., the x-axis direction) in which the lateral member 620 is directed and the direction (e.g., z-axis direction) in which the front surface cover 320 is directed.

Figure 16:
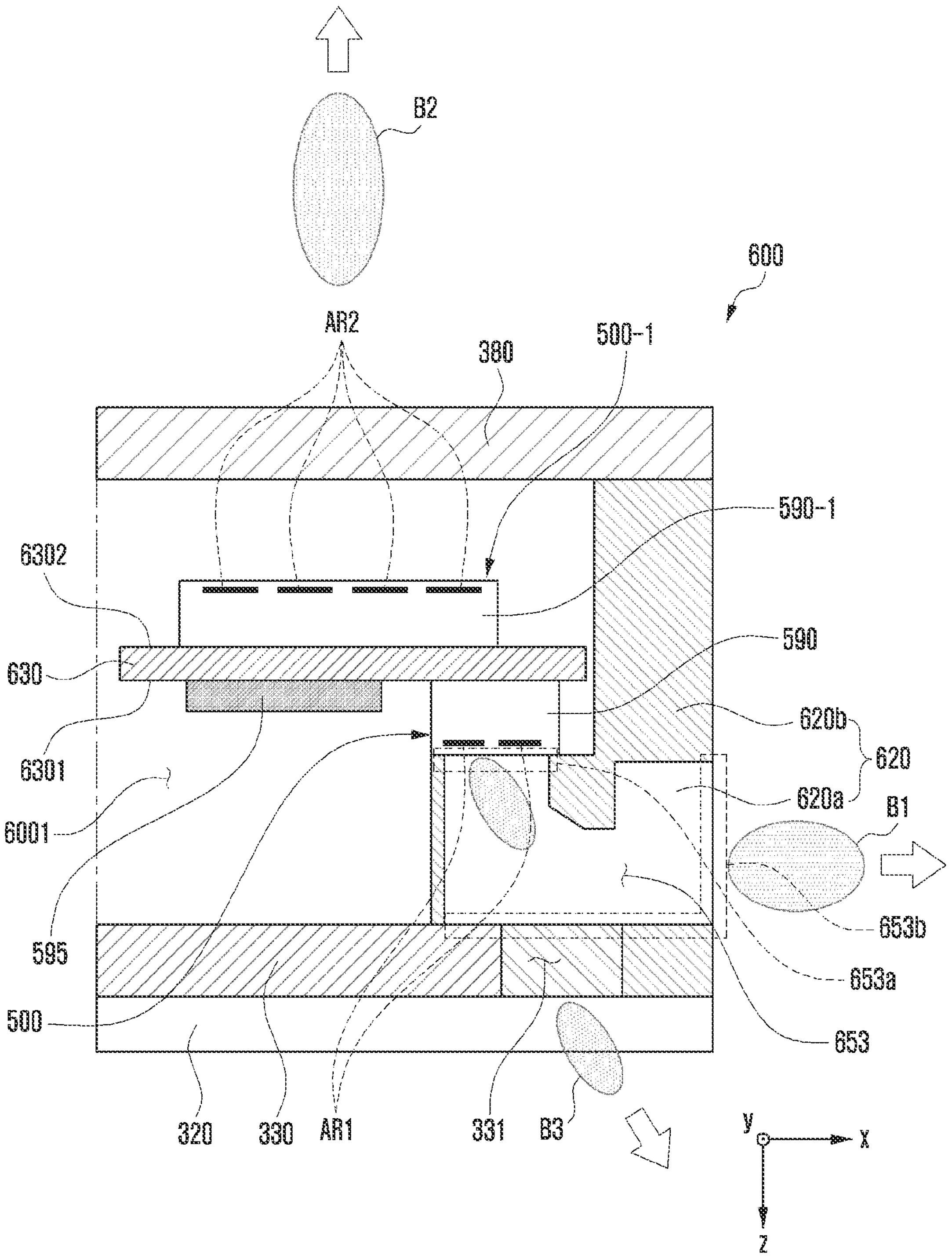
FIG. 16 is a partial cross-sectional view of the electronic device including the antenna structure disposed using the plurality of through-holes according to various embodiments of the present disclosure.

FIG. 16 is a partial cross-sectional view of the electronic device including the antenna structure disposed using the plurality of through-holes according to various embodiments.

To describe the electronic device 600 in FIG. 16, the elements, which are substantially the same as the elements of the electronic device 600 in FIG. 15A, will be designated by the same reference numerals, and a detailed description thereof may not be repeated.

With reference to FIG. 16, the electronic device 600 may include a through-hole 653 including a first opening portion 653*a* corresponding to the inner space 6001, and a second opening portion 653*b* corresponding to an external environment. According to an embodiment, the first substrate 590 of the first antenna structure 500 may be disposed to correspond to the first opening portion 653*a*. According to an embodiment, at least a part of the second opening portion 653*b* may be formed to correspond to the direction (e.g., the x-axis direction) in which the lateral member 620 is directed, and the remaining part of the second opening portion 653*b* may be formed to correspond to the direction (e.g., the z-axis direction) in which the front surface cover 320 is directed. In this case, the antenna structure 500 may be configured to form the directional beam B1 in the direction (e.g., the x-axis direction) in which the lateral member 620 is directed and to form a directional beam B3, in the direction (e.g., the z-axis direction) in which the front surface cover 320 is directed, in a space 331 (e.g., a BM area) between the display 330 and the lateral member 620. For example, the space 331 between the display 330 and the lateral member 620 may include a non-conductive area through which radio waves radiated from the antenna structure 500 may pass. In various embodiments, the space 331 between the display 330 and the lateral member 620 may include a non-conductive area from which at least a part of a shield member (e.g., a conductive sheet layer) disposed on the rear surface of the display 330 is removed. In various embodiments, the space between the display 330 and the lateral member 620 may also include at least a part of a deactivation area of the display 330 made of a non-conductive material.

According to various example embodiments, an electronic device (e.g., the electronic device 600 in FIG. 7) may include: a housing (e.g., the housing 610 in FIG. 6A) including a lateral portion (e.g., the lateral member 620 in FIG. 7) including a conductive member including a conductive material (e.g., the conductive member 620*a* in FIG. 7) including an inner surface (e.g., the inner surface 621 in FIG. 7), and an outer surface (e.g., the outer surface 622 in FIG. 7) facing the inner surface; an antenna structure including at least one antenna (e.g., the antenna structure 500 in FIG. 7) disposed in the inner space (e.g., the inner space 6001 in FIG. 6A) of the housing and including a substrate (e.g., the substrate 590 in FIG. 7), and the plurality of antenna elements (e.g., the plurality of antenna elements 510, 520, 530, and 540 in FIG. 7) disposed at a first interval (e.g., the first interval d1 in FIG. 7) at the substrate; the plurality of through-holes (e.g., the plurality of through-holes 6231, 6232, 6233, and 6234 in FIG. 7) penetrating from the inner surface to at least a part of the outer surface and corresponding to the plurality of antenna elements; and a wireless communication circuit (e.g., the wireless communication circuit 595 in FIG. 5) disposed in the inner space and configured to transmit and/or receive radio signals in a specified frequency band through the antenna structure. First opening portions (e.g., the first opening portions 6231*a* in FIG. 7) of the plurality of through-holes formed in the inner surfaces may be disposed at a first interval, and second opening portions (e.g., the second opening portion 6231*b* in FIG. 7) of the plurality of through-holes formed in the outer surfaces may be disposed at a second interval (e.g., the interval d2 in FIG. 7) larger than the first interval.

According to various example embodiments, the lateral member may at least include at least a part of the non-conductive member, and the plurality of through-holes may include the non-conductive member disposed therein.

According to various example embodiments, the antenna structure may be disposed and configured to form the directional beam in the direction from the inner surface to the outer surface direction through the plurality of through-holes.

According to various example embodiments, the plurality of through-holes may comprise a tube structure inclined leftward or rightward based on the center of the antenna structure.

According to various example embodiments, the second interval may be at most λ/2 based on an operating frequency band of the antenna structure.

According to various example embodiments, the inner surface of each of the plurality of through-holes may have a rectilinear shape or a stepped shape having at least one stepped portion.

According to various example embodiments, a cross-section of each of the plurality of through-holes may have a rectangular, circular, or polygonal shape.

According to various example embodiments, the first opening portion and the second opening portion may have the same shape and/or size.

According to various example embodiments, the plurality of through-holes may each be tapered wherein a space volume of the through holes increases in a direction from the inner surface to the outer surface.

According to various example embodiments, the through-hole, disposed at the outermost periphery among the plurality of through-holes, may include the inclined tube structure in which a first imaginary line connecting the first opening portion and the second opening portion has a gradient not exceeding 45 degrees with respect to a second imaginary line extending in the direction perpendicular to the substrate.

According to various example embodiments, a dielectric cover may be disposed on the outer surface and cover the plurality of through-holes.

According to various example embodiments, the dielectric cover may comprise a material having a permittivity greater than a permittivity of the plurality of through-holes.

According to various example embodiments, the second intervals between the plurality of through-holes may be substantially equal to each another.

According to various example embodiments, the housing may include the front surface cover, and the rear surface cover facing a direction opposite to the direction in which the front surface cover faces. The lateral member may be disposed between the front surface cover and the rear surface cover.

According to various example embodiments, at least a part of the second opening portion may be formed in the direction in which the rear surface cover faces.

According to various example embodiments, the electronic device may include the display disposed in the inner space and configured to be visible from the outside through at least a part of the front surface cover.

According to various example embodiments, at least a part of the second opening portion may be formed to be directed toward the space between the display and the lateral member.

According to various example embodiments, the space may include a black matrix (BM) area of the display.

According to various example embodiments, the wireless communication circuit may be disposed on the substrate.

According to various example embodiments, the specified frequency band may include a frequency band in a range of 3 GHz to 100 GHz.

Further, the various example embodiments of the present disclosure illustrated in the drawings are provided as particular examples for easily explaining the technical contents according to the embodiment of the present disclosure and helping understand the embodiment of the present disclosure, but not intended to limit the scope of the embodiment of the present disclosure. Accordingly, the scope of the various embodiments of the present disclosure should be interpreted as including all alterations or modifications derived from the technical spirit of the various embodiments of the present disclosure in addition to the disclosed embodiments. It will also be understood that any of the embodiment(s) described herein may be used in conjunction with any other embodiment(s) described herein.

What is claimed is:

1. An electronic device comprising:

a housing including a front cover, a rear cover facing a direction opposite to a direction in which the front cover faces, and a lateral member surrounding a space between the front cover and the rear cover, the lateral member including a conductive member including an inner surface and an outer surface;

an antenna structure disposed in the space of the housing and including a substrate, and a plurality of antenna elements disposed at a first interval at the substrate;

a plurality of through-holes penetrating from the inner surface to the outer surface and corresponding to the plurality of antenna elements; and a wireless communication circuit disposed in the space and configured to transmit or receive a radio signal in a specified frequency band through the antenna structure, wherein first opening portions of the plurality of through-holes formed in the inner surface are disposed at the first interval, and second opening portions of the plurality of through-holes formed in the outer surface are disposed at a second interval greater than the first interval, and wherein at least a part of the second opening portion is formed in a direction in which the rear cover faces.

2. The electronic device of claim 1, wherein the lateral member at least partially includes a non-conductive member, and a plurality of through-holes include the non-conductive member disposed therein.

3. The electronic device of claim 1, wherein the antenna structure is disposed and configured to form a directional beam in a direction from the inner surface to the outer surface through the plurality of through-holes.

4. The electronic device of claim 1, wherein the plurality of through-holes comprise a tube structure inclined leftward or rightward based on a center of the antenna structure.

5. The electronic device of claim 1, wherein the second interval is at most $\lambda/2$ based on an operating frequency band of the antenna structure.

6. The electronic device of claim 1, wherein an inner surface of each of the plurality of through-holes has a rectilinear shape or a stepped including at least one stepped portion.

7. The electronic device of claim 1, wherein a cross-section of each of the plurality of through-holes has a rectangular, circular, or polygonal shape.

8. The electronic device of claim 1, wherein the first opening portion and the second opening portion have the same shape and/or size.

9. The electronic device of claim 1, wherein the plurality of through-holes is each tapered so that a space volume of each of the plurality of through-holes increases in a direction from the inner surface to the outer surface.

10. The electronic device of claim 1, wherein the through-hole disposed at an outermost periphery among the plurality of through-holes includes an inclined tube structure wherein a first imaginary line connecting the first opening portion and the second opening portion has a gradient not exceeding 45 degrees with respect to a second imaginary line extending in a direction perpendicular to the substrate.

11. The electronic device of claim 1, comprising:

a dielectric cover disposed on the outer surface and configured to cover the plurality of through-holes.

12. The electronic device of claim 11, wherein the dielectric cover comprises a material having permittivity greater than a permittivity of the plurality of through-holes.

13. The electronic device of claim 1, wherein the second intervals between the plurality of through-holes are substantially equal to one another.

14. The electronic device of claim 1, comprising:

a display disposed in the space and configured to be visible from the outside through at least a part of the front surface cover.

15. The electronic device of claim 1, wherein the wireless communication circuit is disposed on the substrate.

16. The electronic device of claim 1, wherein the specified frequency band includes a frequency band in a range of 3 GHz to 100 GHz.

17. An electronic device comprising:

a housing including a front cover, a rear cover facing a direction opposite to a direction in which the front cover faces, and a lateral member surrounding a space between the front cover and the rear cover, the lateral member including a conductive member including an inner surface and an outer surface;

an antenna structure disposed in the space of the housing and including a substrate, and a plurality of antenna elements disposed at a first interval at the substrate;

a display disposed in the space and configured to be visible from the outside through at least a part of the front cover;

a plurality of through-holes penetrating from the inner surface to the outer surface and corresponding to the plurality of antenna elements; and a wireless communication circuit disposed in the space and configured to transmit or receive a radio signal in a specified frequency band through the antenna structure, wherein first opening portions of the plurality of through-holes formed in the inner surface are disposed at the first interval, and second opening portions of the plurality of through-holes formed in the outer surface are disposed at a second interval greater than the first interval, and wherein at least a part of the second opening portion is directed toward a space between the display and the lateral member.

18. The electronic device of claim 17, wherein the space between the display and the lateral member includes a black matrix (BM) area of the display.

* * * * *